(12) United States Patent
Conway

(10) Patent No.: US 11,254,091 B2
(45) Date of Patent: Feb. 22, 2022

(54) PROTECTIVE THERMAL SLEEVE FOR PORTABLE ELECTRONIC DEVICES AND PHARMACEUTICALS

(71) Applicant: eXClaim IP, LLC, Cornelius, NC (US)

(72) Inventor: Kevin Conway, Cornelius, NC (US)

(73) Assignee: eXClaim IP, LLC, Cornelius, NC (US)

( * ) Notice: Subject to any disclaimer, the term of this patent is extended or adjusted under 35 U.S.C. 154(b) by 0 days.

(21) Appl. No.: 16/844,990

(22) Filed: Apr. 9, 2020

(65) Prior Publication Data

US 2020/0230912 A1 Jul. 23, 2020

Related U.S. Application Data

(63) Continuation-in-part of application No. 15/820,289, filed on Nov. 21, 2017, now Pat. No. 10,669,090.
(Continued)

(51) Int. Cl.
*B32B 5/24* (2006.01)
*B32B 5/02* (2006.01)
(Continued)

(52) U.S. Cl.
CPC .............. *B32B 5/245* (2013.01); *A45C 11/00* (2013.01); *A61J 1/16* (2013.01); *B32B 1/00* (2013.01);
(Continued)

(58) Field of Classification Search
CPC .. B65D 81/3886; B65D 29/02; B65D 81/022; B65D 81/027; B65D 81/051;
(Continued)

(56) References Cited

U.S. PATENT DOCUMENTS 5,219,075 A 6/1993 White
6,652,933 B2 11/2003 Hall
(Continued)

FOREIGN PATENT DOCUMENTS

WO 2006086802 A2 8/2006

OTHER PUBLICATIONS

Application No. PCT/US2021/026595, International Search Report and Written Opinion dated Jul. 12, 2021.

*Primary Examiner* — Rafael A Ortiz
(74) *Attorney, Agent, or Firm* — Woods Rogers PLC; Nathan A. Evans

(57) ABSTRACT

Protective sleeves for portable electronic devices or thermally sensitive pharmaceuticals are provided. More particularly, embodiments relate to a protective sleeve that is capable of protecting a portable electronic device or a thermally sensitive pharmaceutical enclosed within from multiple environmental effects, including heat, cold, water, impact forces from being dropped, and germs and bacteria. In embodiments, provided is a protective sleeve comprising: an outer layer of material with a reflective surface; and an inner layer of material with a protective surface that can include an antimicrobial agent; wherein the outer layer of material and the inner layer of material are layered together and configured to receive a portable electronic device or thermally sensitive pharmaceutical. A thermal masking material and products thereof which can be used in a variety of applications where reduced visibility and heat detection is desired such as military, law enforcement, and hunting are also described.

25 Claims, 22 Drawing Sheets

Related U.S. Application Data

(60) Provisional application No. 62/424,579, filed on Nov. 21, 2016, provisional application No. 62/460,946, filed on Feb. 20, 2017, provisional application No. 62/460,943, filed on Feb. 20, 2017, provisional application No. 62/492,382, filed on May 1, 2017, provisional application No. 62/492,386, filed on May 1, 2017.

(51) Int. Cl.
| | | |
|---|---|---|
| B32B 27/36 | (2006.01) | |
| B32B 1/00 | (2006.01) | |
| A45C 11/00 | (2006.01) | |
| A61J 1/16 | (2006.01) | |
| B32B 5/18 | (2006.01) | |
| B32B 27/34 | (2006.01) | |
| B32B 27/06 | (2006.01) | |
| G06K 19/077 | (2006.01) | |

(52) U.S. Cl.
CPC ............... *B32B 5/02* (2013.01); *B32B 5/18* (2013.01); *B32B 27/065* (2013.01); *B32B 27/34* (2013.01); *B32B 27/36* (2013.01); *G06K 19/07758* (2013.01); *A45C 2011/002* (2013.01); *A45C 2011/003* (2013.01); *B32B 2255/10* (2013.01); *B32B 2262/0276* (2013.01); *B32B 2307/71* (2013.01); *B32B 2307/73* (2013.01)

(58) Field of Classification Search
CPC .... B65D 81/107; B65D 81/127; B65D 81/38; H04B 1/3886; H04B 81/389; H04B 81/3897; A45F 2200/0516; A45F 2005/008; G06F 1/1626; G06F 2200/1633; G06F 1/1628; B32B 5/245; B32B 1/00; B32B 5/02; B32B 5/18; B32B 27/065; B32B 27/36; B32B 2255/10; B32B 2262/0276; B32B 2307/71; B32B 2307/73; A45C 11/00; A45C 2011/002; A45C 2011/003; A61J 1/16
USPC .................................. 206/320; 224/929, 930
See application file for complete search history.

(56) References Cited

U.S. PATENT DOCUMENTS

| | | | | |
|---|---|---|---|---|
| 8,205,744 | B1* | 6/2012 | Tashjian | A45C 11/00 206/320 |
| 2001/0036520 | A1* | 11/2001 | Hall | B32B 5/18 428/35.5 |
| 2006/0040333 | A1* | 2/2006 | Zocchi | A61F 17/00 435/14 |
| 2011/0203890 | A1* | 8/2011 | Chung | A45C 13/02 190/109 |
| 2012/0061134 | A1* | 3/2012 | Kennedy | H04B 1/3888 174/377 |
| 2015/0052617 | A1* | 2/2015 | Zar | G06F 21/6245 726/27 |
| 2016/0010895 | A1* | 1/2016 | Erickson | F03G 6/065 60/641.15 |
| 2016/0192516 | A1* | 6/2016 | Thompson | H04B 1/3888 224/219 |
| 2018/0115338 | A1 | 4/2018 | Hermanowski et al. | |

* cited by examiner

PROTECTIVE THERMAL SLEEVE FOR PORTABLE ELECTRONIC DEVICES AND PHARMACEUTICALS

CROSS-REFERENCE TO RELATED APPLICATIONS

The present application relies on the disclosures of and claims priority to and the benefit of the filing dates of U.S. Provisional Application No. 62/424,579, filed Nov. 21, 2016, U.S. Provisional Application Nos. 62/460,946 and 62/460,943, filed Feb. 20, 2017, U.S. Provisional Application Nos. 62/492,382 and 62/492,386, filed May 1, 2017, and U.S. Non-Provisional application Ser. No. 15/820,289, filed Nov. 21, 2017. The disclosures of each of these applications are hereby incorporated by reference herein in their entireties.

BACKGROUND OF THE INVENTION

Field of the Invention

The present invention relates to protective sleeves for portable electronic devices. More particularly, embodiments of the present invention relate to a protective sleeve that can protect a portable electronic device, such as by way of example only, a cell phone, a pager, a laptop computer, or a tablet computer enclosed within from multiple environmental effects, including heat, cold, water, impact forces from being dropped, and microbes (germs and/or viruses). The sleeve is also buoyant. Further, embodiments of the invention relate to a thermal masking material which can be used in a variety of applications where reduced visibility and heat detection is desired such as military, law enforcement, and hunting, as well as products incorporating the thermal masking material. The protective sleeve can provide thermal protection for thermally sensitive medications or pharmaceuticals that one may carry with them, such as, by way of example only, epinephrine and insulin.

Description of Related Art

Exposing a cell phone to an outside heat source is the most common cause of overheating. Leaving a phone sitting directly in the sun, inside a hot car or under a lamp that produces heat can cause the phone to feel hot to the touch. Particularly harmful is to expose the battery to heat when it is fully charged, as the battery will be periodically checked and charged back up to 100 percent, applying stress. Depth of discharge also affects battery life, meaning it is best not to let the charge run down to zero percent. Anything over about 30 degrees centigrade will start negatively impacting a lithium-ion battery, and this is a temperature phones typically climb above every time charging occurs.

With temperatures consistently reaching the high nineties or more, leaving a phone in a vehicle can quickly lead to overheating. If a phone needs to be left in a vehicle, it should be tucked away in a shady spot. This protective action may not completely stop the phone from reaching high temperatures, but it will be much safer than leaving it in direct sunlight.

It is known that smart phones are sensitive to environmental conditions. By way of example, temperatures in excess of 95° Fahrenheit, as well as temperatures less than 32° Fahrenheit, can negatively affect the performance of a cell phone. Some smartphones list the optimum range of temperatures in their technical specification. For example, when the phone is turned off, an iPhone can withstand temperatures between −4° and 113° Fahrenheit. When the phone is turned on, the range is much narrower. Apple suggests 32° Fahrenheit as the lowest operating ambient temperature. Other phones are rated for much lower temperatures, and some can go as low as −4° Fahrenheit while in operation.

When lithium-ion batteries are exposed to cold temperatures, their performance suffers. When cold, a phone battery can drain faster than normal or it might indicate it has ample power remaining and then suddenly go dead. The problems are only temporary, and the battery should behave normally when the device is brought back up to warmer temperatures. Heat affects mobile phones, mobile laptops and mobile tablets that are exposed to the sun or heat when, for example, they are exposed to direct sun when located on a boat or left in a car during the summertime. Cold affects mobile phones, mobile laptops and mobile tablets that are exposed to cold ambient temperatures when, for example, being utilized on a ski slope.

Dropping a cell phone can cause damage to multiple portions of a cell phone. Cracked glass is one of the most common forms of damage to broken cell phones. The glass can crack when a phone is dropped or accidentally stepped on or crushed while leaning against an object. Manufacturers are trying to make cell phones sturdier as the devices become more advanced, but smartphone screens are still made of breakable glass.

Dropping of a cell phone can affect the cell phone buttons. Buttons that do not work or stick are functionally problematic. Nonfunctioning buttons affect the ability to text, search the Internet, and dial the phone. Buttons may stop working because of a cell phone's circuits being exposed to moisture or heat or become broken as a result of a drop.

Cell phone speakers can stop working due to loose or corroded internal parts, or damaged hardware from dropping the phone. There is a need for an environmentally protective sleeve for a cell phone, smart phone, laptop, or tablet that protects these mobile electronic devices from overheating, extreme cold, damage from being dropped, and damage from water.

It is known that one's cell phone is a carrier of microbes, including bacteria and viruses. Studies have found pathogens on cell phones, including *Streptococcus*, MRSA, and even *E. coli*. Viruses can also be spread by contact with cell phones if one person is sick with strep throat or influenza and coughs on their cell phone before handing it off to a friend, by way of example. A 2004 study by the University of Arizona found the typical worker's desk, which tends to be where one places a smartphone for about 40 hours a week, has hundreds of times more bacteria per square inch than an office toilet seat. Separately, according to a 2011 study done by researchers at the London School of Hygiene & Tropical Medicine, found fecal matter on 1 out of every 6 cell phones tested. And, "Mobile phones have become veritable reservoirs of pathogens as they touch faces, ears, lips and hands of different users of different health conditions," researchers observed in a 2009 study of bacteria removed from personal calling devices.

Thermal signatures (such as an IR signature) are known, as are ways to mask the thermal signature with a reflective material like that of metalized Mylar. Such masking has been utilized for security, military and law enforcement. However, while masking the thermal signature of the individual or a piece of equipment such as a military tank, the reflective material draws attention to an adverse distant observer by way of its reflection of light. There is a need for a material that will mask a thermal signature while minimizing reflective light. Such material, as taught herein, may also be used to protect an electronic device from damage.

SUMMARY OF THE INVENTION

According to embodiments, the present invention provides a protective sleeve for an electronic device, such as, by way of example only, that of a cell phone, mobile phone, pager, laptop computer, tablet computer, or camera. In other embodiments the protective sleeve is utilized for maintaining a certain safety range of temperature for thermally sensitive medications such as, by way of example only, epinephrine or insulin, that a person may carry with them. The protective sleeve also provides impact protection should the case be dropped with an electronic device inside and provides the ability to float with an electronic device housed therein should the protective case be accidently dropped into body of water. The protective sleeve may have multiple layers, including a reflective layer, one or more insulating or durability layers, which may include a buoyant layer, and a protective layer. In embodiments, the layers may also be referred to as surfaces. In embodiments, the reflective layer is the outermost layer. The reflective layer can be made of metalized Mylar® or a material with similar reflectivity and can have an emissivity within a range of about 0.05 to 0.40. In embodiments, the protective sleeve includes a buoyant layer disposed between the outermost layer and an innermost layer, which can be made of foam or other buoyant material with a thickness in the range of about 0.12 inches to 1 inch. The foam layer can be made of a closed cell foam material. In aspects, closed cell foam provides better water resistance and a higher level of buoyancy than open cell foam, thus providing a better level of buoyancy protection for the stored electronic device. However, in certain other embodiments, the foam layer is made of an open cell foam material. In embodiments, the protective layer is the innermost layer (i.e. closest to the electronic device) and is made of fleece, microfleece, or similar material. In embodiments, the innermost layer containing fleece or microfleece can serve as an insulating layer or as both an insulating layer and a protective layer. In certain embodiments the innermost layer closest to that of the electronic device can be that of an antimicrobial layer. In certain embodiments the innermost layer can be both that of an insulating layer and an antimicrobial layer. In certain embodiments the innermost layer can be that of a protective layer and an antimicrobial layer, such as, by way of example only, that of an Agion antimicrobial treated fabric, Agion treated polyester, and/or Agion treated textiles. In certain embodiments the innermost layer can be that of an insulating layer, protective layer, and an antimicrobial layer. In certain embodiments the antimicrobial agent is present on the side of the innermost layer facing the electronic device. In certain embodiments the antimicrobial agent is present throughout the innermost layer facing the electronic device. In embodiments, the protective sleeve can include only 2 layers of those described above or can include 3 or even 4 or more layers. According to embodiments, the electronic device or thermally sensitive medication that can be housed by the thermal protective sleeve can be by way of example only, that of a smart phone, cell phone, mobile phone, laptop, tablet, camera, epinephrine, or insulin.

The antimicrobial agent can be limited to the side of the innermost layer of the protective sleeve closest to the electronic device or thermally sensitive medication. The antimicrobial agent can be found within the innermost layer of the protective sleeve. The antimicrobial agent can be contained within both sides of the innermost layer adjacent to the electronic device or thermally sensitive medication. The antimicrobial agent can be found throughout the protective sleeve. The antimicrobial agent can be found within 2 or more of the layers of the protective sleeve. The antimicrobial agent can be found within the innermost layer, the outermost layer, or both. Thus, the innermost layer may comprise an antimicrobial agent, the outermost layer may comprise an antimicrobial agent, or both the innermost layer and the outermost layer may comprise an antimicrobial agent.

The antimicrobial agent used can be one or more biocides acting in different ways according to their chemical and structural nature and affinity level to certain target sites within microbial cells. Those different modes of action may be:

a. Damage or inhibition of cell wall synthesis, which is critical for the life and survival of bacterial species;

b. Inhibition of cell membrane function, which is an important barrier that regulates the intra- and extra-cellular flow of substances, and could result in the leakage of vital solutes for the cells' survival;

c. Inhibition of protein synthesis, which is the basis of cell enzymes and structures, consequently leading to the death of the organism or the inhibition of its growth and multiplication;

d. Inhibition of nucleic acid synthesis (DNA and/or RNA) due to the binding of some antimicrobial agents to components involved in the process of DNA and/or RNA synthesis. This inhibition interferes with normal cellular processes, compromising microbes' multiplication and survival; and/or e. Inhibition of other metabolic processes, for instance the disruption of the folic acid pathway, which is essential for bacteria to produce precursors important for DNA synthesis.

The following table includes examples only of antimicrobial products including a listing of their major antimicrobial mechanism of action.

| Product Name | Company | Description |
| --- | --- | --- |
| agion ® | Sciessent | Additive based on silver and zeolite |
| AlphaSan ® | Milliken Chemical | Additive based on silver |
| BioGuard ® | AEGIS Microbe Shield ™ | Finishing agent based on 3-trimethoxysilylpropyldimethyloctadecyl ammonium chloride |
| Biozac ZS | Zschimmer & Schwarz Mohsdorf GmbH & CoKG | Finishing agent based on PHMB |
| Cosmocil CQ ™ | Lonza | Additive based on polyaminopropyl biguanide |
| Eosy ® | Unitika | Finishing agent based on chitosan |
| Irgaguard ®1000 | BASF (Ciba) | Finishing agent based on triclosan |

| Product Name | Company | Description |
| --- | --- | --- |
| Irgasan | Sigma Aldrich | Finishing agent based on triclosan |
| Microban ® | Microban International | Agent based on triclosan |
| Reputex ™ | Lonza | Finishing agent based on PHMB |
| Sanigard KC | L.N. Chemical Industries | Finishing agent belonging to the QAC group |
| Saniguard Nano-ZN | L.N. Chemical Industries | Finishing solution based on an aqueous nano-dispersion of zinc oxide |
| Sanitized ® | SANITIZED | Finishing agent based on 3-trimethoxysilylpropyldimethyltetradecyl ammonium chloride |
| Silpure ® | Thomson Research Associates | Finishing agent based on fine silver particles |
| Silvadur ™ | The Dow Chemical Company | Interpenetrating polymer network with silver ions |
| SmartSilver ® | Nanohorizon Inc. | Agent based on silver nanoparticles |
| Silvérion 2400 | PURE Bioscience, Inc. | Agent based on a stabilized silver complex |

According to other embodiments, the present invention provides a protective sleeve where the outer layer comprises a printed layer and/or colored layer. A reflective layer can be located beneath the printed outer layer. The outer layer may be composed of nylon or similar material. In embodiments, the layers of the protective sleeve are arranged from the outermost to innermost layers according to a first layer which is a colored material; a second layer which is a reflective material; a third layer which is nylon ripstop or similar material; a fourth layer which is foam; and a fifth layer which is microfleece or one of an antimicrobial treated textile, antimicrobial treated polyester, or antimicrobial treated microfleece. In other embodiments, the colored material can be printed. In other embodiments, the layers of the protective sleeve are arranged from the outermost to innermost according to a first layer which is a colored material; a second layer which is a reflective material; a third layer which is foam; and a fourth layer which is microfleece. In other embodiments, the protective sleeve can have an arrangement of layers from the outermost to innermost layers as follows: a first layer which is a reflective material; a second layer which is nylon ripstop or similar material; a third layer which is foam; and a fourth layer which is microfleece or one of an antimicrobial treated textile, antimicrobial treated polyester, or antimicrobial treated microfleece. Any combination of these types of layers is feasible depending on the application and additional or fewer layers can be included.

According to embodiments, the emissivity of the protective sleeve may be in the range of 0.05 to 0.6, including 0.4 to 0.6, 0.2 to 0.4, 0.3 to 0.5, 0.05 to 0.2, and so on. Further, the thermal protective sleeve as disclosed herein is capable of protecting an electronic device within a range of negative 32° Fahrenheit to 300° Fahrenheit.

According to various embodiments, the reflective layer may be a laminate which includes two materials: a highly reflective continuous metalized Mylar® polyester film (such as aluminized polyester film) laminated to Rip Stop Nylon or similar material.

Various features and advantages of the invention, only some of which are discussed herein, are described as follows according to embodiments. In embodiments, the protective sleeve is capable of providing thermal protection which protects the mobile electronic devices from overheating in direct and indirect sunlight and high ambient temperatures. Further, in embodiments, the protective sleeve is capable of floating in water, with or without a mobile electronic device inside. Additionally, in embodiments, the protective sleeve is capable of reflecting infrared (IR) and ultraviolet (UV) heat from sunlight. Further, in embodiments, the protective sleeve is capable of providing access to charging ports on the electronic device, allowing a user to stream Bluetooth® data, and/or allowing a user to send and receive phone calls and other data during use. Still further, in embodiments the protective sleeve is capable of providing drop/shock protection during use.

Further, according to embodiments, the protective sleeve is capable of being used with or without a protective case housing the device. Additionally, according to embodiments, the protective sleeve is capable of providing insulation from extreme cold such that it is capable of preventing the device from freezing when temperatures are below 32° F. Additional embodiments include a feature such as a user ID tag for the owner to place initials or other identifying information on the tag.

Additional embodiments include a thermal masking material which includes a colored or printed outer layer and a continuous metalized reflective layer such as a metalized reflective polyethylene terephthalate (PET) film (e.g. Mylar®) disposed beneath the colored or printed outer layer as an inner liner. In embodiments, the continuous metalized reflective material is laminated to a Rip Stop Nylon material or similar material. In embodiments, the reflective layer is disposed between an inner liner and an outer surface layer as a middle layer. The thermal masking material can have a variety of uses such as a sniper blind, camouflage clothing, or camouflage covering. Further, the thermal masking material can cover a piece of equipment or a human such that there is an air gap between the piece of equipment or human and the material. The air gap can include cooled air.

Further, embodiments of the thermal masking material include an outer nylon layer and a continuous metalized Mylar material layer attached, bonded, or laminated to the underside of the outer nylon layer. The outer nylon layer can be printed and/or colored. The nylon layer can include Rip Stop Nylon. In embodiments, the reflective surface is located as a middle layer between an outer layer and an inner layer, whereby the inner layer is water resistant. In other embodiments, the reflective surface is located between an outer layer which is water resistant and an inner layer which is a porous layer. Other embodiments include a tape which includes an outer layer, a reflective middle layer and an innermost adhesive layer which can be used to seal air leaks.

These embodiments as well as additional embodiments and their features will be apparent in the foregoing Detailed Description.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Figure 1A:
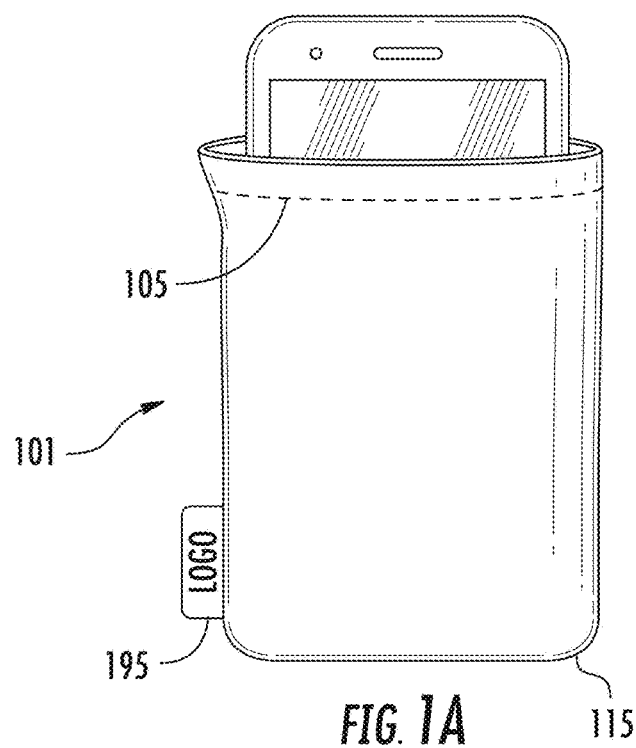
FIG. 1A is a schematic drawing showing an outer view of a protective sleeve according to an embodiment of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As used herein, the term "about" is understood as within a range of normal tolerance in the art, for example within 2 standard deviations of the mean. The term "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As used herein, the term "metallized" (as in "metallized" Mylar®) refers to a material such as a polymer film which has been coated with a thin layer of metal, such as aluminum, chromium, or nickel, typically through a physical vapor deposition (PVD) process. The thin layer of metal can be coated on one surface of the material or both surfaces.

As used herein, the term "laminated" (or variations including "laminate", "lamination", and the like) refers to the process or result of creating a composite material by joining two layers together, typically under heat and pressure and through use of an adhesive.

As used herein, "Mylar®" may be used interchangeably with "biaxially-oriented polyethylene terephthalate (PET) film", "polyethylene terephthalate (PET) film", "polyester film", and similar terminology.

According to embodiments, the protective sleeve may include two layers (outer, inner), three layers (outer, middle and inner), or four layers (outer, first middle layer, second middle layer, inner layer). In embodiments, the protective sleeve may include one or more layer of material in any number of layers. One or more of the layers of the protective sleeve may be bonded together, or may not be bonded together. In embodiments, some, all or none of the layers of material of the protective sleeve may be bonded to another layer in the protective sleeve. In embodiments, some, all or none of the layers of material of the protective sleeve may be bonded to another layer in the protective sleeve. In embodiments, some, all or none of the layers of material of the protective sleeve may be joined together.

Various embodiments described below include a reflective layer such as a metallized Mylar® polyester film laminated to another material such as a Rip Stop Nylon to create a composite material. According to embodiments, the reflective layer may have a reflective surface (e.g. a surface which includes a thin metallic film which is deposited through metallization) and a non-reflective surface, or two reflective surfaces. In some embodiments where the reflective layer has one reflective surface, the composite may be manufactured such that the non-reflective surface is bound directly to the Rip Stop Nylon, such that the reflective surface remains exposed. In other embodiments where the reflective layer has one reflective surface, the composite may be manufactured such that that the reflective surface is bound directly to the Rip Stop Nylon such that the reflective surface is hidden. In embodiments where the reflective layer has two reflective surfaces, one reflective surface will be bound directly to the Rip Stop Nylon and hidden, and one will remain exposed. Thus, in embodiments of the protective sleeve which follow, a reflective surface may face outward (away from the electronic device), inward (toward the electronic device), or both inward and outward. The orientation of the reflective surfaces will depend on the particular application of the protective sleeve (e.g. whether it is intended to protect the device from heat, cold, or both). Further, the reflective surface(s) may be hidden (e.g. covered by another layer) or exposed. Not wishing to be bound by theory, it is the reflective surface(s) of the reflective layer which are believed to primarily trap/reflect infrared energy within or keep infrared energy out of the protective sleeve.

A two-layer embodiment of the invention provides an outer reflective layer and inner protective layer. The outer reflective layer may include Mylar® polyester film, such as a highly-reflective "continuous" metalized Mylar® polyester film, or aluminized polyester film laminated to a Rip Stop Nylon or similar material, and the emissivity of the outer layer may be in the range of about 0.05 to 0.40, such as less than 0.40, less than 0.30, less than 0.20, or less than 0.10. For example, the emissivity can be 0.1 to 0.2, or 0.02 to 0.35, or 0.01 to 0.25, or 0.04 to 0.15, and so on. Further, in embodiments, the outer metalized surface of the outer reflective layer has a reflectivity in the range of between 80% and 100%, with a preferred range between 90% and 100%. The inner protective layer may include a micro-fleece type material (lining) which is capable of protecting the touch screen on the device and preventing scratches.

A three-layer embodiment provides an outer reflective layer, a middle insulation/air space layer, and an inner protective layer. The outer reflective layer may include Mylar® polyester film such as a highly-reflective "continuous" metalized Mylar® polyester film, or aluminized polyester film laminated to a Rip Stop Nylon or similar material, and the emissivity of the outer layer may be less than 0.40 (0.05-0.40 is a preferred range), or in any range provided herein. Further, in embodiments, the outer metalized surface of the outer reflective layer has a reflectivity in the range of between 80% and 100%, with a preferred range between 90% and 100%. The middle insulation layer may include ⅛-⅜" thick open cell insulation foam which provides buoyancy and additional drop/shock protection for the device. The inside protective layer may include a micro-fleece type material (lining) which protects the touch screen on the device and prevents scratches.

A first four-layer embodiment provides an outer reflective layer, a first middle insulation layer, a second middle insulation layer, an inner protective layer. The outside reflective layer may include Mylar® polyester film or aluminized polyester film or similar material, and the emissivity of outer layer may be less than 0.40 (0.05-0.40 is a preferred range), or in any range provided herein. The first middle insulation layer may include nylon or polyester Rip Stop material similar to 70D Rip Stop Nylon. The second middle insulation layer may include a ⅛-⅜" thick open cell insulation foam which provides buoyancy and additional drop/shock protection for the device. The inside protective layer may include a micro-fleece type material (lining) which protects the touch screen on the device and prevents scratches.

A second four-layer embodiment provides an outer protective double layer which includes a layer of printed Rip Stop Nylon or similar material and a highly-reflective "continuous" metalized Mylar® polyester film, or aluminized polyester film laminated to a Rip Stop Nylon or similar material. Further, in embodiments, the surface of the outer reflective layer has a reflectivity in the range of between 80% and 100%, with a preferred range between 90% and 100%. Further, this embodiment includes a middle insulation/air space layer and an inner protective layer. The middle insulation layer may include ⅛-⅜" thick open cell insulation foam which provides buoyancy and additional drop/shock protection for the device. The inside protective layer may include a micro-fleece type material (lining) which protects the touch screen on the device and prevents scratches.

A third four-layer embodiment provides an outer reflective layer, a first middle insulation layer, a second middle insulation layer, an inner protective layer. The outside reflective layer may include Mylar® polyester film, such as a highly-reflective "continuous" metalized Mylar® polyester film, or aluminized polyester film laminated to a Rip Stop Nylon or similar material, and the emissivity of outer layer may be less than 0.40 (0.05-0.40 is a preferred range), or in any range provided herein. Further, in embodiments, the outer metalized surface of the outer reflective layer has a reflectivity in the range of between 80% and 100%, with a preferred range between 90% and 100%. The first middle insulation layer may include nylon or polyester Rip Stop material similar to 70D Rip Stop Nylon. The second middle insulation layer may include a ⅛-⅜" thick open cell insulation foam which provides buoyancy and additional drop/shock protection for the device. The inside protective layer may include a micro-fleece type material (lining) which protects the touch screen on the device and prevents scratches.

According to embodiments, a closure can be provided to close the protective sleeve, which closure may be a plastic spring strip closure or other closure system such as a hook and loop closure or similar type of closure. However, according to embodiments, the closure may be configured so that it does not seal the sleeve and thus allows thermal energy to dissipate through. Further, any embodiment may include a woven tag which provides a user ID on the tag.

Figure 1B:
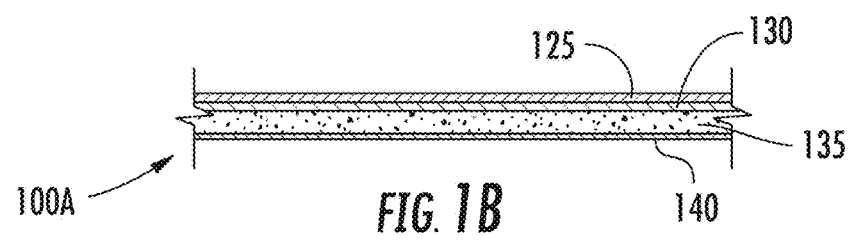
FIG. 1B is a schematic drawing showing a layer composition of a protective sleeve according an embodiment of the invention.
Figure 1C:
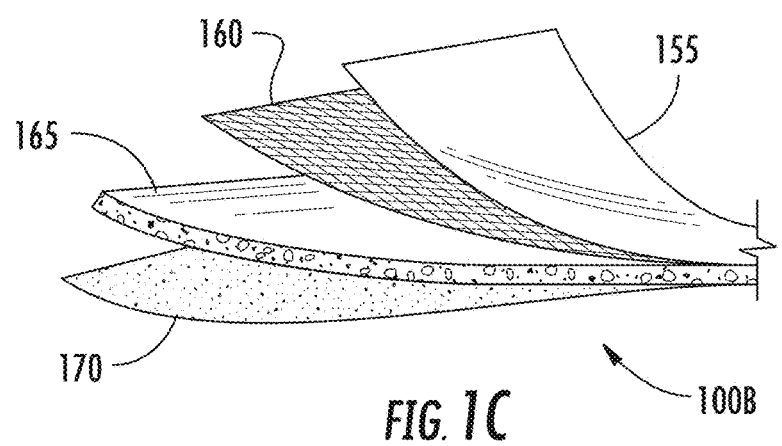
FIG. 1C is a schematic drawing showing a cross-section of a portion of a protective sleeve and its layer composition according to an embodiment of the invention.

Turning now to the figures, FIG. 1A shows an embodiment of a protective sleeve 101 during use. At the top of the protective sleeve 101 is a reinforced closure 105 for closing the sleeve over a cell phone during use. Also shown are one or more internal seams 115 which can be used to bind together the various layers of the protective sleeve. The internal seams may be provided at the bottom and sides of the protective sleeve to join the various layers together, while leaving an opening at the top of the protective sleeve where the reinforced closure is provided. At the bottom left is a woven tag 195 for indicating branding or personal identification indicia, however, such a tag can be placed anywhere on the protective sleeve. FIG. 1B schematically shows that the structure 100A of the various layers of a 4-layer embodiment may be generally implemented as an outer reflective layer 125, a first middle layer below the outer reflective layer which is a durability layer 130, a second middle layer below the first middle layer which is an insulation layer 135, and an inner layer below the insulation layer which is a protective layer 140. It should be pointed out that the inner layer may or may not be an antimicrobial layer. FIG. 1C shows that this structure 100B of the 4-layer embodiment may be specifically implemented as an outer Mylar® layer 155, a first middle layer which is Rip Stop Nylon 160, a second middle layer which is open cell foam 165, and an inner or interior layer which is by way of example only, one of a micro fleece, polyester, fabric, or textile liner 170. Additional or fewer layers may be incorporated. In certain embodiments the inner layer 170 is treated with an antimicrobial agent. In certain embodiments the material of inner layer 170 is fabricated with an antimicrobial agent.

Figure 2:
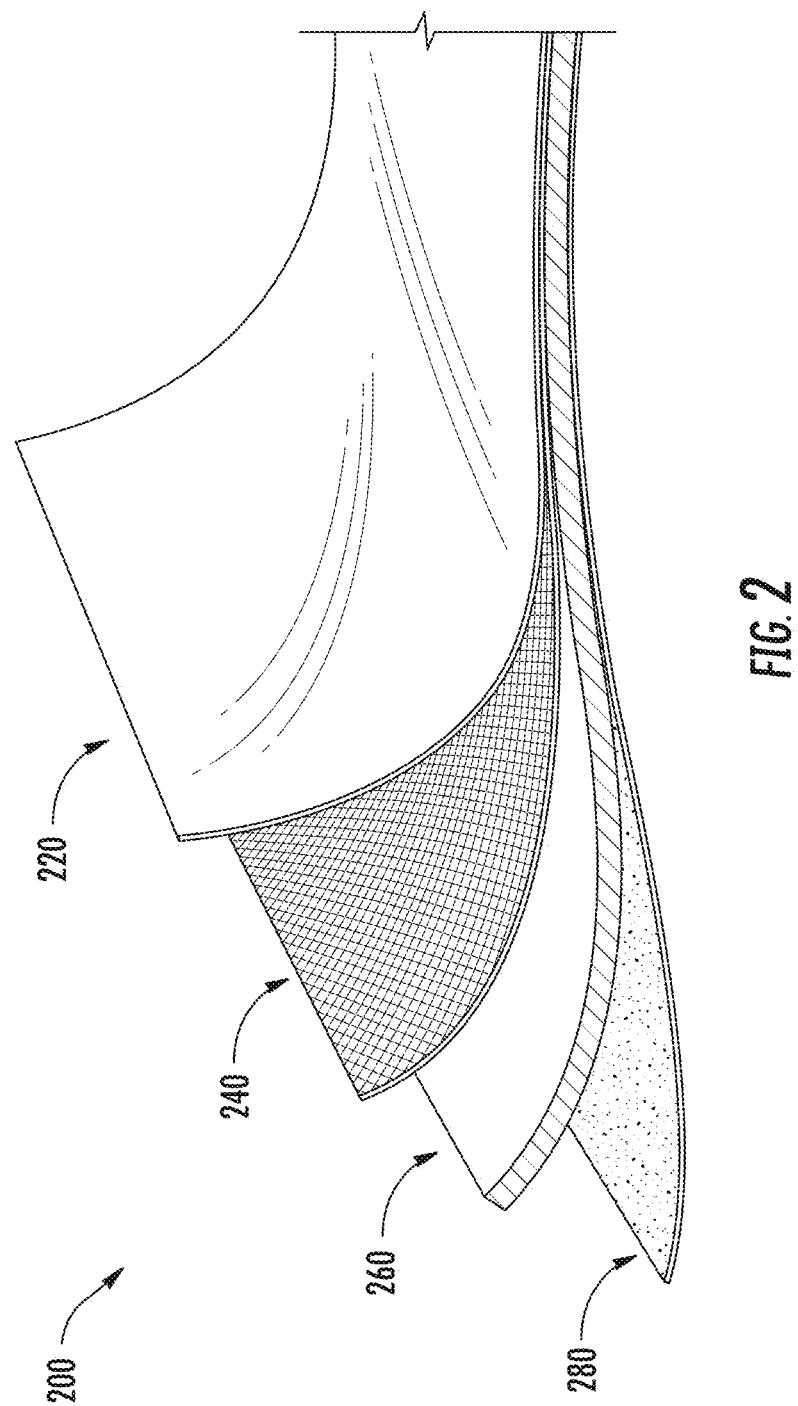
FIG. 2 is a schematic drawing showing a layer composition of a protective sleeve according an embodiment of the invention.
Figure 3:
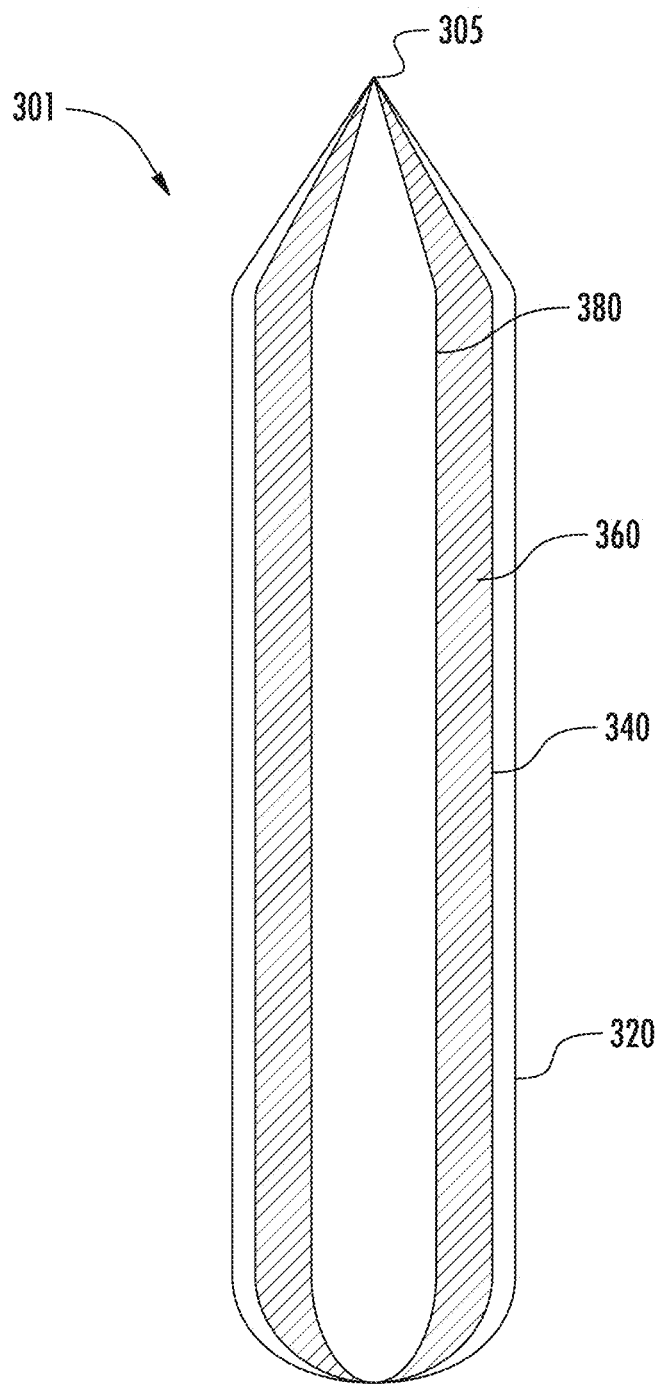
FIG. 3 is a schematic drawing showing a cross-section of a protective sleeve showing its layer composition according to an embodiment of the invention.

FIGS. 2 and 3 show different perspective views of the composition of a 4-layer (or 4-material) embodiment, where FIG. 2 illustrates the layered composition itself 200 and FIG. 3 shows a cross-section of the protective sleeve 301 to further illustrate the arrangement of layers in this embodiment. The outer layer 220, 320 (Material A) is an IR Reflective material with an emissivity in the range of about 0.05-0.2 constructed of Mylar® such as a highly reflective "continuous" metalized Mylar® or material with similar properties. The first middle layer 240, 340 (Material B) may be nylon or polyester Rip Stop material similar to 70D Rip Stop Nylon. The second middle layer 260, 360 (Material C) is open cell foam or similar material. The inner or interior layer 280, 380 (Material D) is by way of example only, one of a micro-fleece, polyester, fabric, or textile material. Material D can be treated with an antimicrobial agent. Material D can be fabricated with an antimicrobial agent present. Material D can be that of an antimicrobial fabric or antimicrobial textile. In embodiments, the foam of Material C can be that of an open cell foam or closed cell foam material. In certain embodiments, the open cell foam is provided with a thickness of ⅛ of an inch or greater. In other embodiments, the closed cell foam is provided with a thickness of 1/16 of an inch or greater.

In another embodiment (shown in FIG. 3), the outer layer 320 (Material A) is printed Rip Stop Nylon or similar material. The first middle layer 340 (Material B) is an IR Reflective material with an emissivity in the range of about 0.05-0.2 constructed of Mylar® or material with similar properties. The second middle layer 360 (Material C) is open cell foam or similar material. The inner or interior layer 380 (Material D) is polyester microfleece or similar type material. In embodiments, the open cell foam of Material C is provided as the thickest layer of the construction. In embodiments, the open cell foam is provided at a thickness of at least ⅜ of an inch.

Figure 4B:
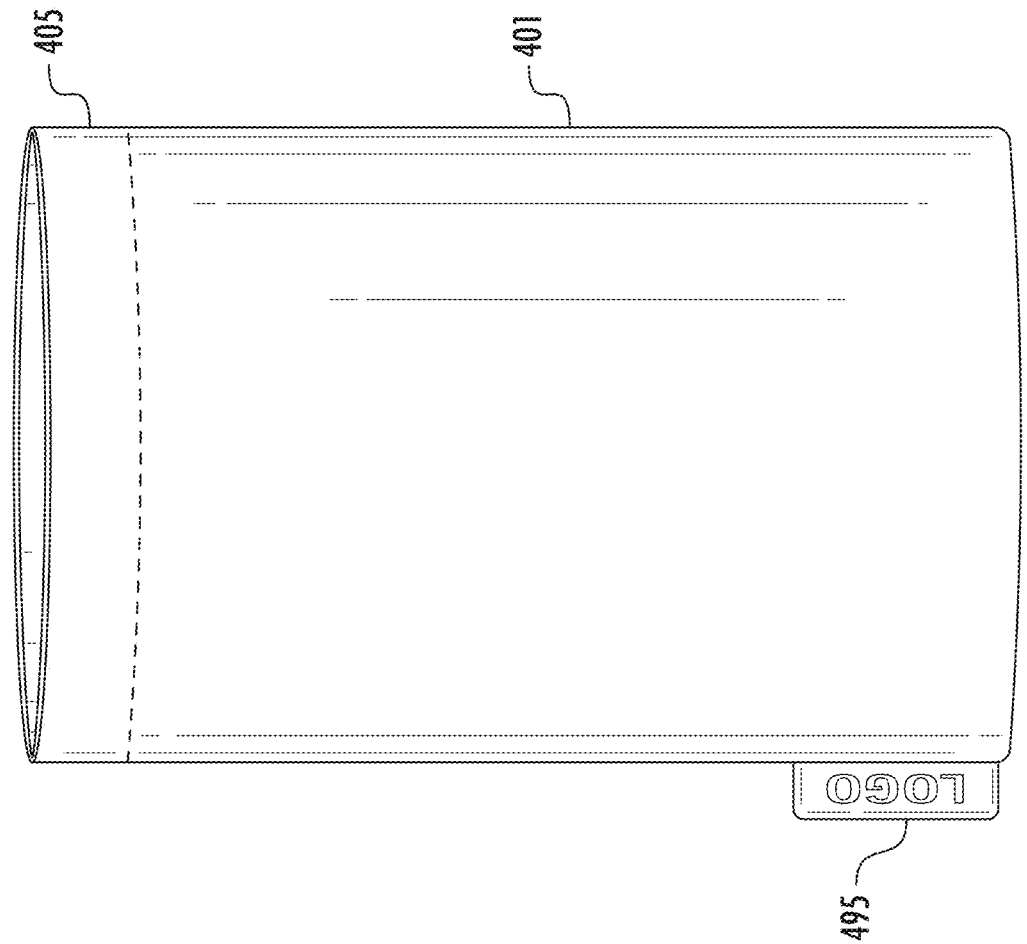
FIG. 4B is a schematic drawing showing an outer view of a protective sleeve according to an embodiment of the invention.
Figure 4A:
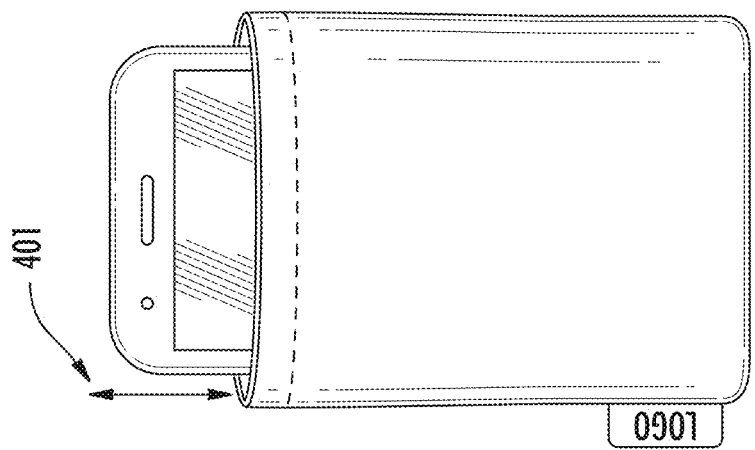
FIG. 4A is a schematic drawing showing the direction of placement or removal of an electronic device from a protective sleeve according to an embodiment of the invention.

Turning now to FIG. 4A, shown in this embodiment 401 is the direction of placement or removal of a mobile electronic device from a protective sleeve. FIG. 4B shows an outer view of another embodiment of a protective sleeve with the device removed, including, at the top, a reinforced opening/closure system 405, below that, the body of the protective sleeve itself 401 to protect the mobile electronic device, and at the bottom left, the branding or user ID tag 495.

Figure 5C:
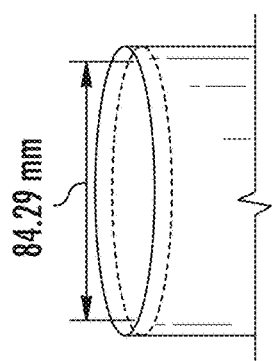
FIGS. 5A-C are schematic diagrams showing various interior dimensions of a protective sleeve according to an embodiment of the invention.
Figure 5B:
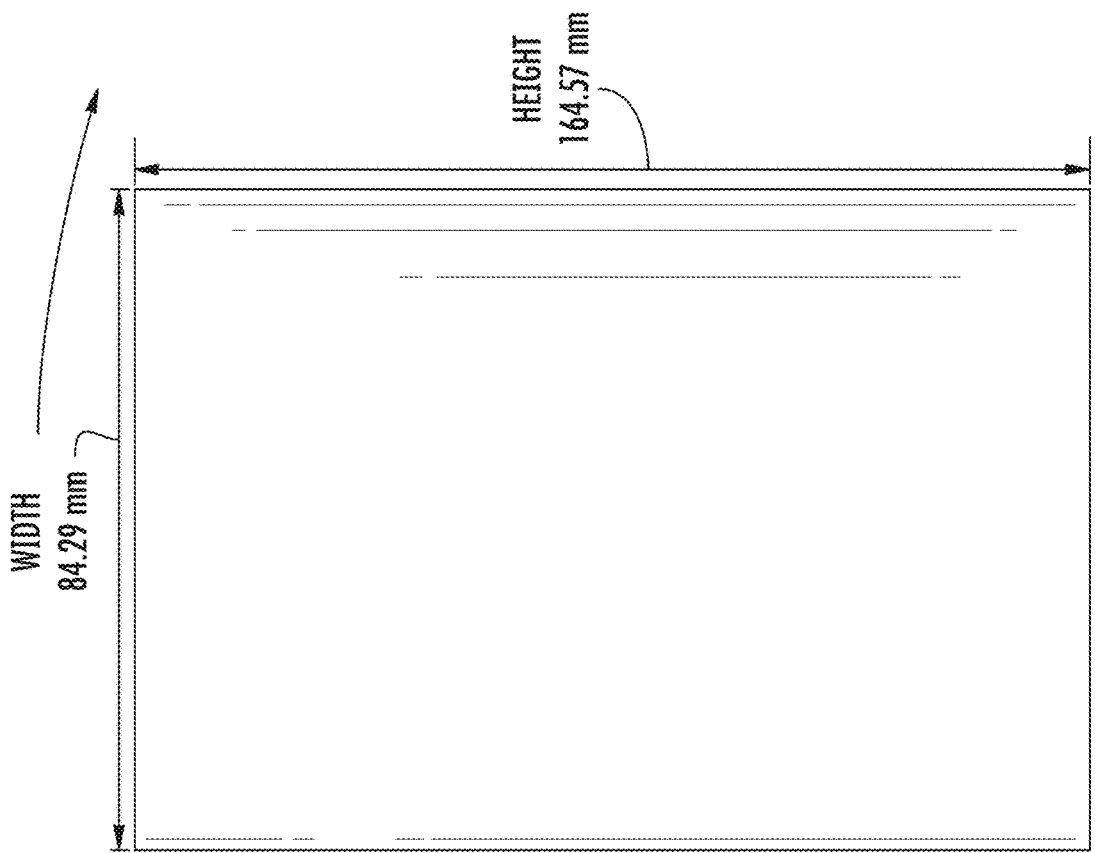
Figure 5A:
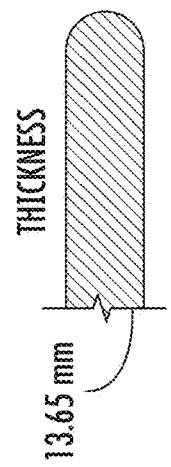
Figure 6C:
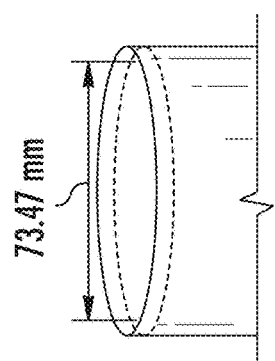
FIGS. 6A-C are schematic diagrams showing various interior dimensions of a protective sleeve according to another embodiment of the invention.
Figure 6B:
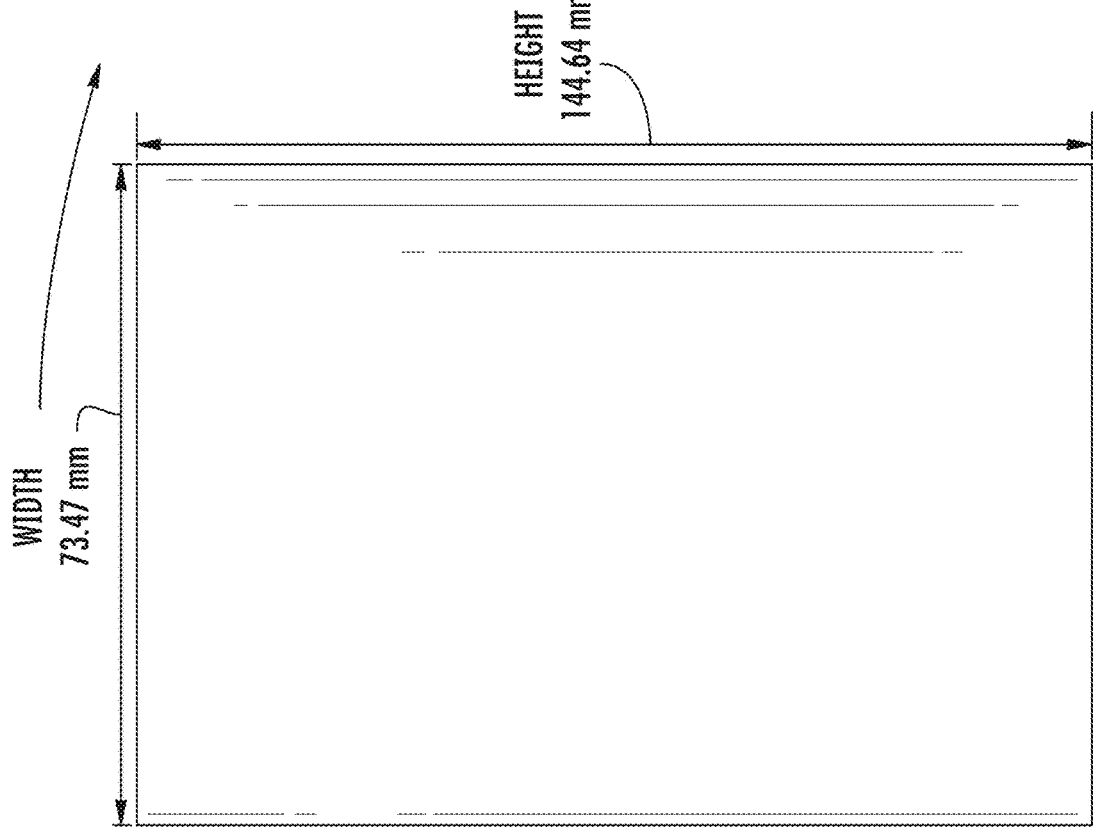
Figure 6A:
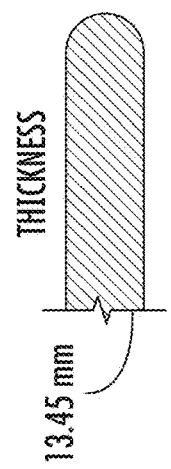

FIGS. 5A-5C show various dimensions of a particular embodiment of the protective sleeve, where FIG. 5A shows that the protective sleeve has a thickness of, in one embodiment, 13.65 mm, FIG. 5B and FIG. 5C show that the protective sleeve has a width of, in one embodiment, 84.29 mm and FIG. 5B shows the protective sleeve has a height of, in one embodiment, 164.57 mm. FIGS. 6A-6C show various dimensions of another embodiment of the protective sleeve, where FIG. 6A shows that the protective sleeve has a thickness of, in one embodiment, 13.45 mm, FIG. 5B and FIG. 5C shows that the protective sleeve has a width of, in one embodiment, 73.47 mm and FIG. 5B shows the protective sleeve has a height of, in one embodiment, 144.64 mm.

Figure 7:
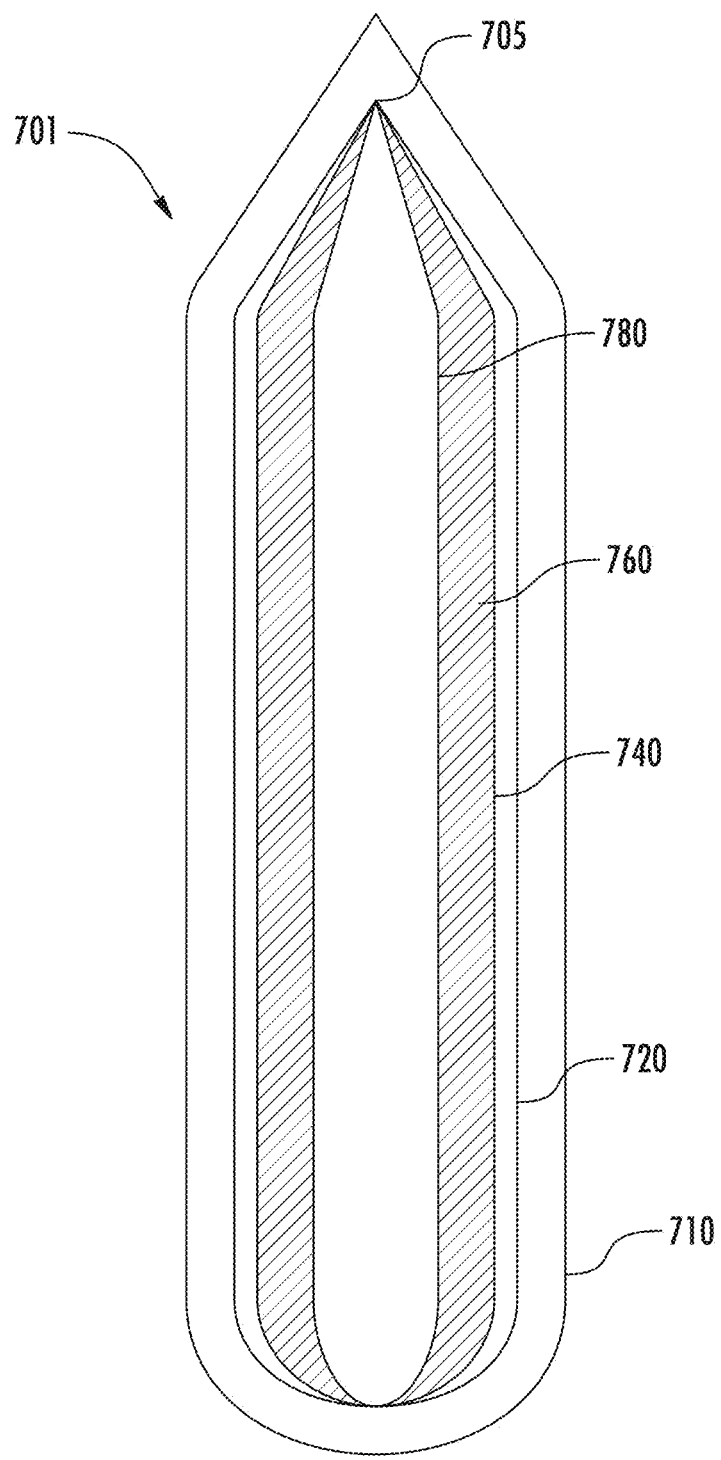
FIG. 7 is a schematic drawing showing a cross-section of a protective sleeve showing its layer composition according to an embodiment of the invention.

FIG. 7 shows a cross-section of a 5-layer (or 5-material) embodiment of the protective sleeve 701 which includes an outer layer 710, first middle layer 720, second middle layer 740, third middle layer 760, and an inner layer 780. The outer layer 710 (Material A) is printed Rip Stop Nylon or similar material. The first middle layer 720 (Material B) is an IR Reflective material with an emissivity in the range of about 0.05-0.2 constructed of Mylar®, such as a highly reflective "continuous" metalized Mylar® or material with similar properties. The second middle layer 740 (Material C) is nylon or polyester Rip Stop material similar to, in one embodiment, 70D Rip Stop Nylon. The third middle layer 760 (Material D) is open cell foam or similar material. The inner layer 780 (Material E) is polyester microfleece or similar-type material. In embodiments, the open cell foam of Material D is provided as the thickest layer of the construction. In embodiments, the open cell foam is provided at a thickness of at least ⅜ of an inch.

Figure 8:
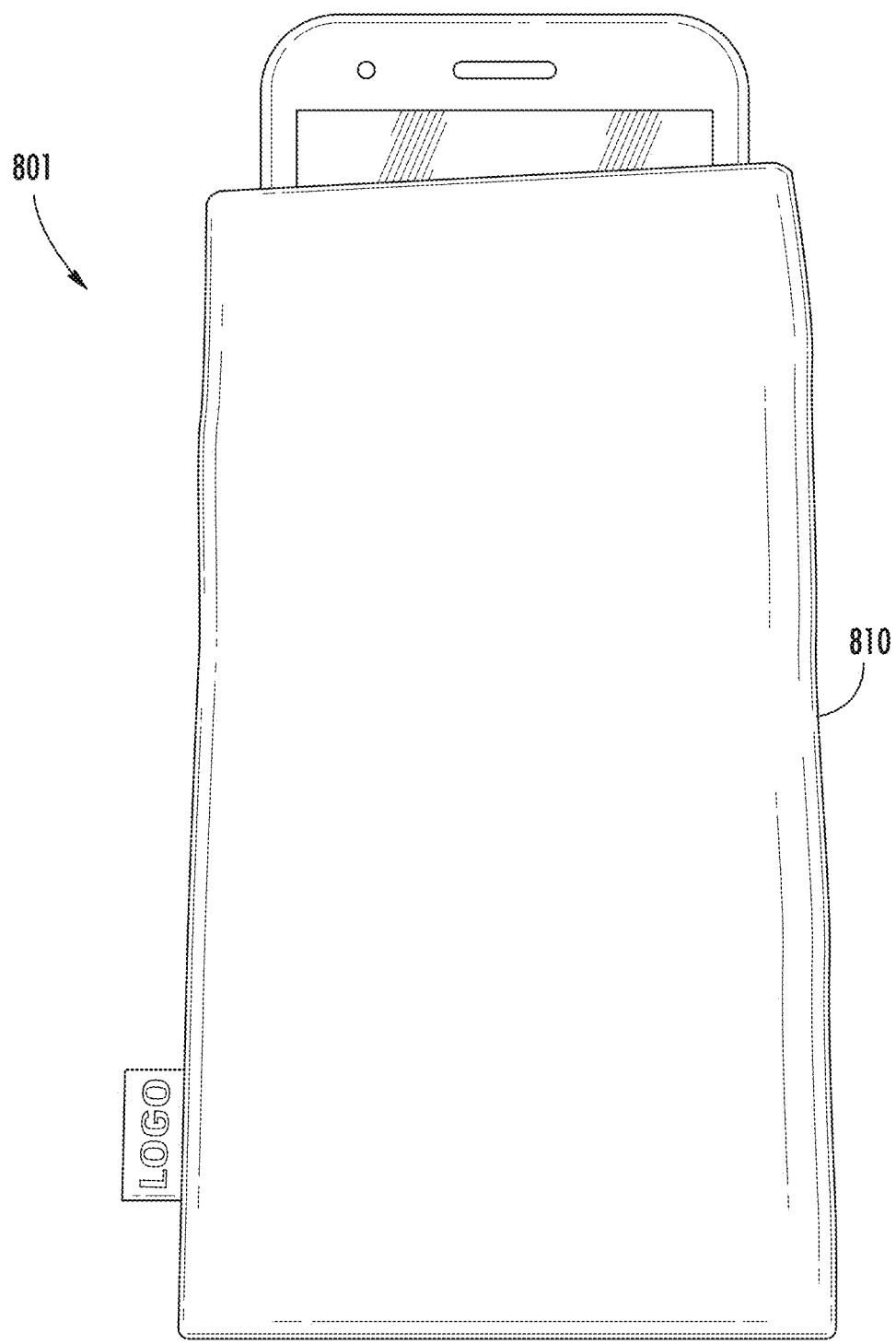
FIG. 8 is a schematic drawing showing an outer printer layer of a protective sleeve according to an embodiment of the invention.

FIG. 8 shows an outer printed layer 810 of a protective sleeve 801 according to an embodiment of the invention. According to this embodiment, the reflective layer is located beneath the outer printed layer 810. Further, the outer printed layer 810 can include Rip Stop Nylon or a coated membrane fabric, and can be printed to include, for example, camouflage, logos, decorative images, designs, and photos. Further, the outer printed layer 810 should not reduce the emissivity of the reflective layer by, in embodiments, more than 15%, such that the overall emissivity of the protective sleeve is in the range of 0.1 to 0.4. Additionally, the outer printed layer 810 should be relatively light such that it weighs, in a preferred embodiment, less than 6 ounces.

In any embodiment of the invention, the outer surface or layer can be coated with any one or more of a water repellant coating, a non-breathable coating, a non-porous coating, a hydrophobic coating, a UV blocking coating, or a UV filtering coating. Further, any embodiment of the invention can include a closure such as a plastic spring strip closure, hook and loop closure, magnetic closure, and the like. Further, it is preferred that the closure does not seal the sleeve completely to allow thermal energy to dissipate through.

Additionally, any embodiment may include additional features such as a woven tag, easy open pull tabs made of PVC rubber, nylon webbing, or similar materials, one or more tether attachment points, a User ID, and a radiofrequency identification (RFID) or Bluetooth low energy (BLW) beacon system or similar technology for alerting the location of the protective sleeve. Further, in certain embodiments, the protective sleeve may include one or more pockets for holding miscellaneous items. The one or more pockets can be formed on the outside or inside surface(s) of the sleeve and have the same or different material construction as the case or sleeve.

Figure 9:
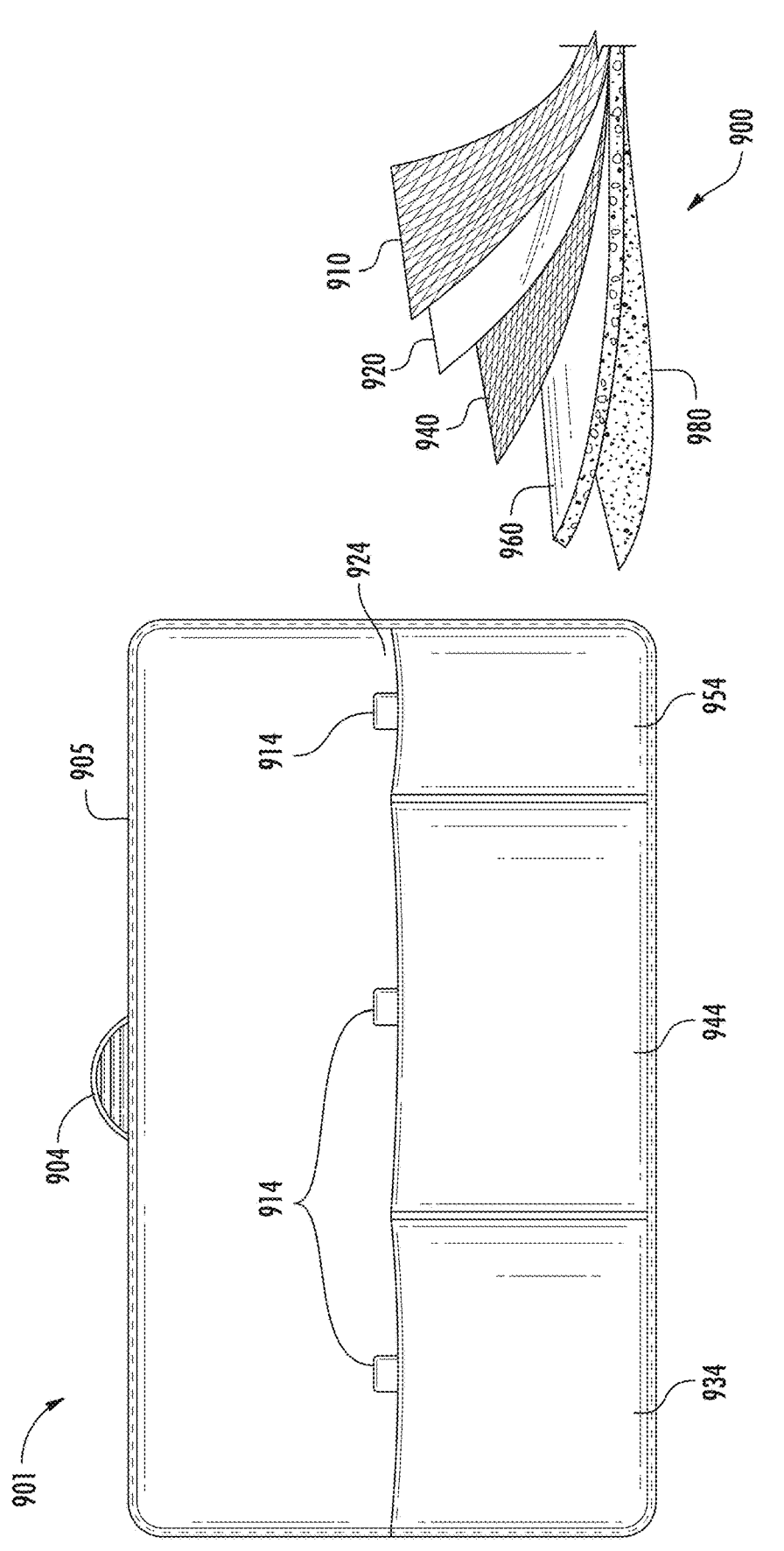
FIGS. 9 and 10 are schematic drawings showing a protective sleeve construction for protecting a tablet or laptop computer according to an embodiment of the invention.
Figure 10:
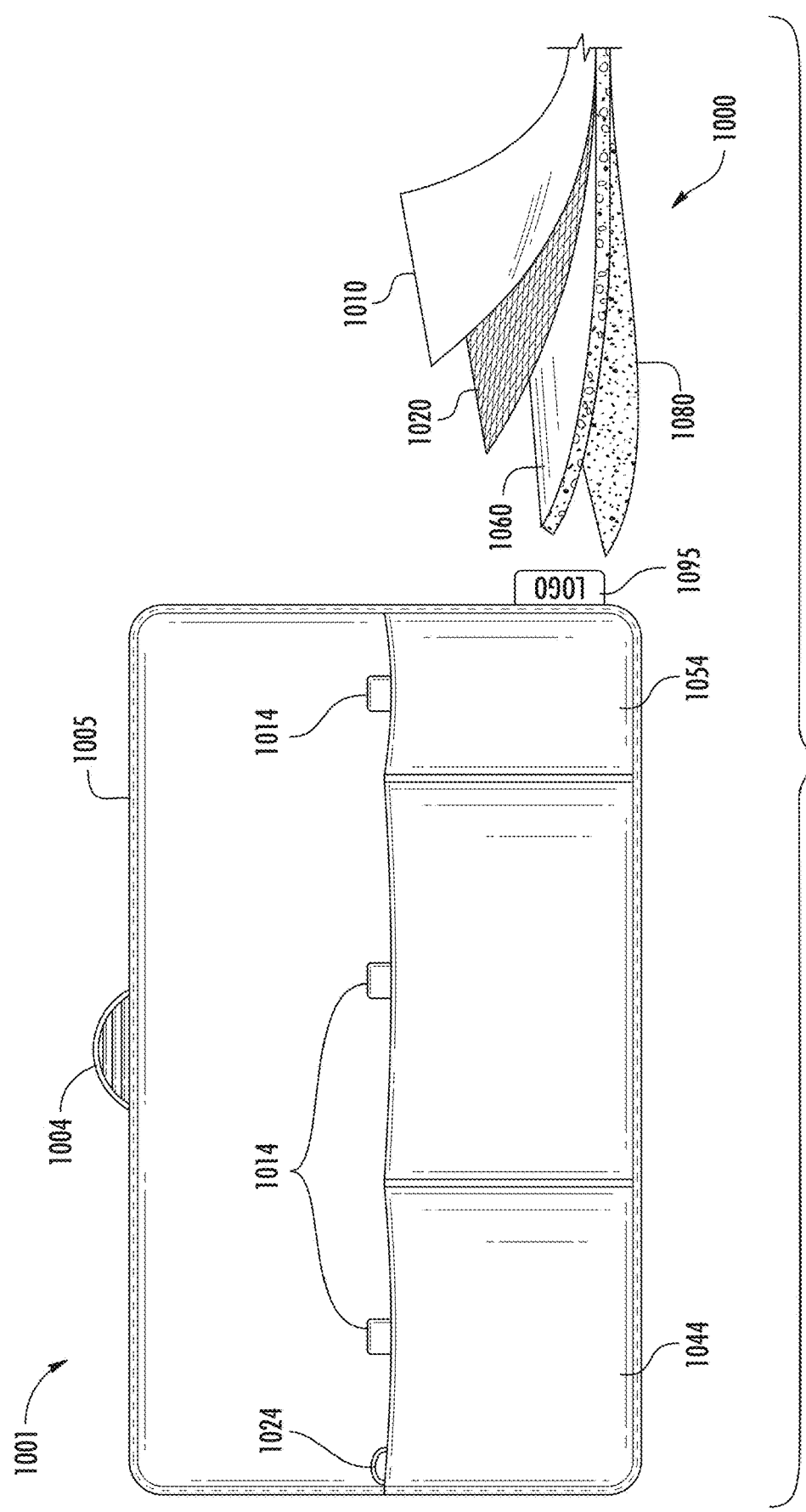

FIGS. 9 and 10 show a protective sleeve or case 901, 1001 embodiment for protecting a tablet or laptop computer. According to this embodiment, the protective case 901, 1001 is constructed to include a magnetic or zippered closure system 905, 1005 and may be open or closed by way of rubber of PVC silicone pull tabs 904, 1004. Additionally, the protective case can include one or more pockets, including pockets dimensioned to hold one or more accessories 934 such as an AC adapter/power supply/plug/charger/cord 944, 1044. An additional pocket may be dimensioned to hold a phone 954, 1054. The one or more pockets may be secured through a hook and loop closure system 924, 1024 and may be open or closed with nylon or webbing pull tabs 914, 1014. In this embodiment, the construction 900 of the protective case has, in an example, an outermost layer 910 which is Rip Stop Nylon or coated membrane fabric which is light in weight (less than 6 ounces). The first middle layer 920 is a reflective layer, the second middle layer is Rip Stop Nylon 940, the third middle layer is an impact layer 960, and the inner layer is a protective liner 980. FIG. 10 shows that the construction 1000 of the multilayer composite material making up the protective case embodiment may also include a layer of colored or non-colored ballistic nylon as the outer layer 1010, a reflective layer 1020, a layer of impact foam as one of the middle layers 1060, and a liner 1080.

Figure 11:
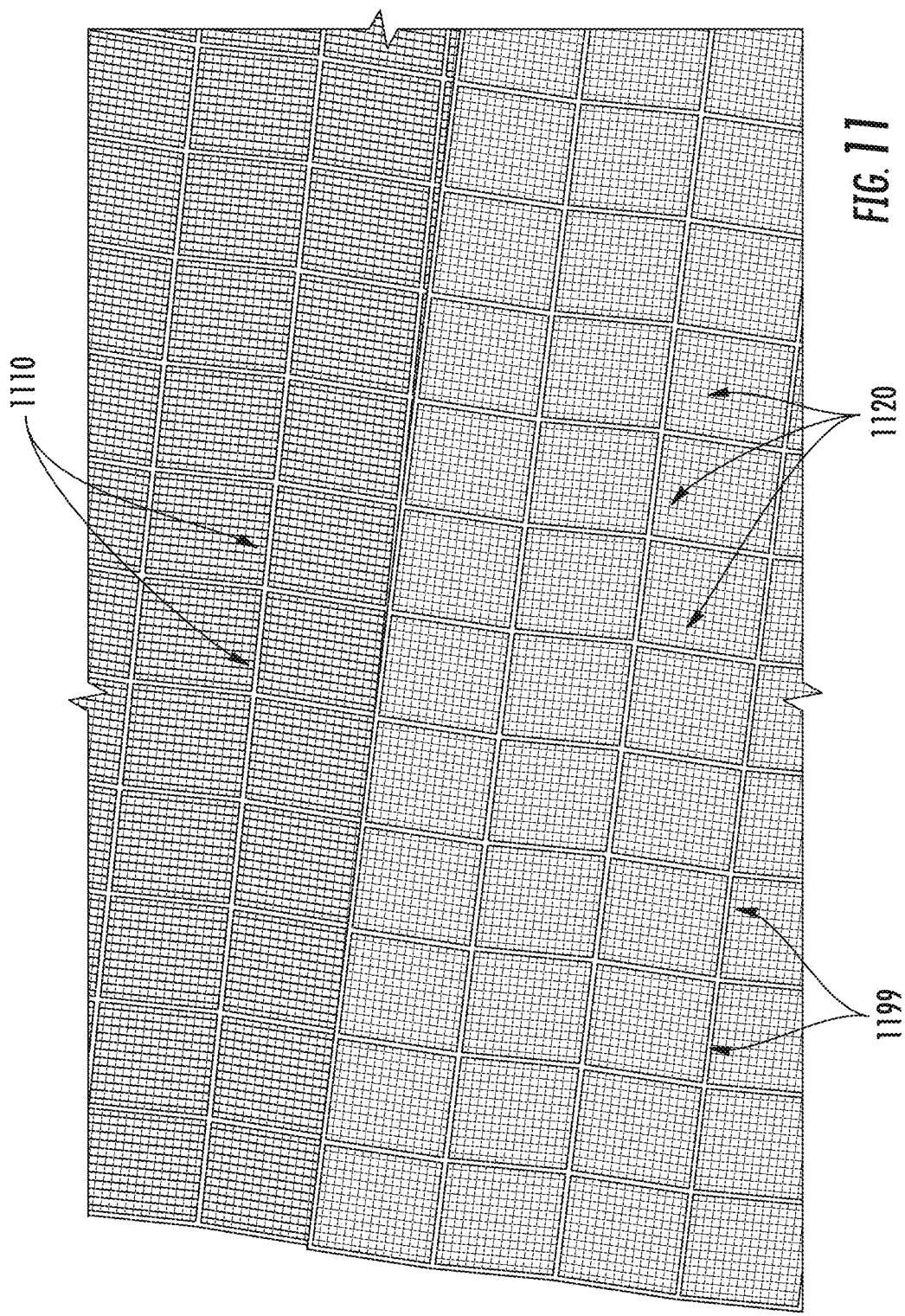
FIG. 11 is a photographic image showing a reflective continuous metalized Mylar® layer (bottom of image) and a layer of Rip Stop Nylon (top of image), which together are laminated to form an outer or internal laminated layer in various embodiments of the protective sleeve.

FIG. 11 is a photographic image showing a layer of Rip Stop Nylon 1110 (top of image) and a reflective continuous metalized Mylar® layer 1120 (bottom of image) which together are laminated to form an outer or internal laminated layer in various embodiments of the protective sleeve. Interwoven reinforcement threads 1199 are also shown arranged in a cross hatch pattern.

Additional embodiments include a thermal masking material which includes a colored or printed nylon outer layer and an IR reflective layer with an emissivity within the range of 0.05 to 0.2 constructed of a highly reflective continuous metalized reflective layer such as a metalized reflective polyethylene terephthalate (PET) film (e.g. Mylar®) disposed beneath the colored or printed outer layer. Various materials of the thermal masking material include the following layers of materials:

Material A: Printed Rip Stop Nylon

Material B: IR Reflective material with an emissivity within the range of 0.05-0.2 constructed and constructed of a highly reflective "continuous" metalized Mylar or similar material Material C: Nylon or polyester ripstop material similar to 70D Rip Stop Nylon Material D: Layer of open cell flat foam surface or similar consisting of no less than 3/8 of an inch thickness Material E: Polyester micro-fleece or similar type material The above materials can be utilized in the thermal masking material in any order, such as in the embodiments below:

Embodiment #1 which is reversible provides the layers/materials in the following order: A, B, C, D, C, B, A.

Embodiment #2 which also is reversible provides the layers/materials in the following order: A, B, C, D, E, D, C, B, A.

Embodiment #3 which is not reversible provides the layers/materials in the following order: A, B, C, D, E.

Embodiment #4 which is not reversible provides the layers in the following order: A, B, C, D.

Embodiment #5 which is not reversible provides the layers in the following order; A, B, C.

Variations of the above embodiments are contemplated which have less layers/materials or layers/materials arranged in a different order, provided that, in embodiments, Material B is always present in at least one layer of the layered construction.

Figure 12:
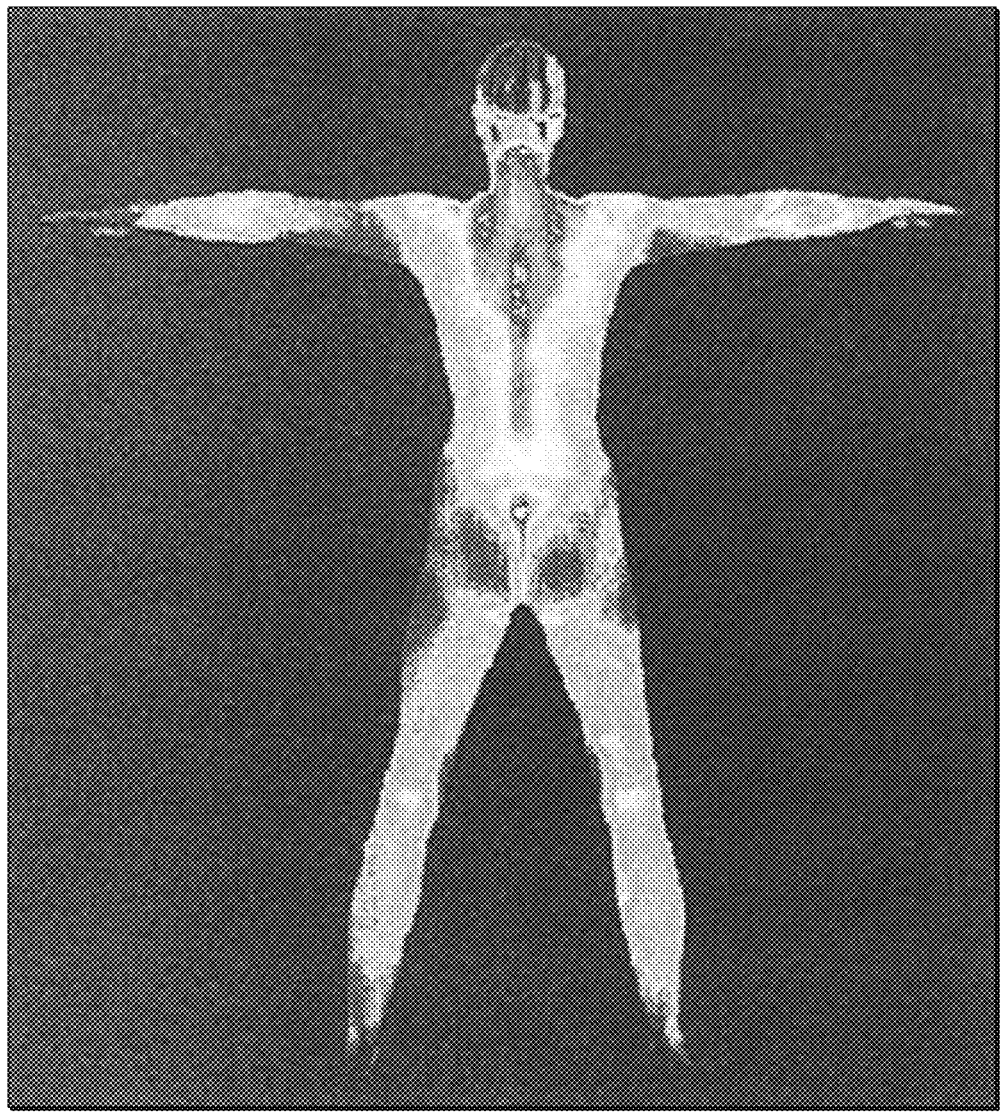
FIG. 12 is a thermal image of a human.
Figure 13:
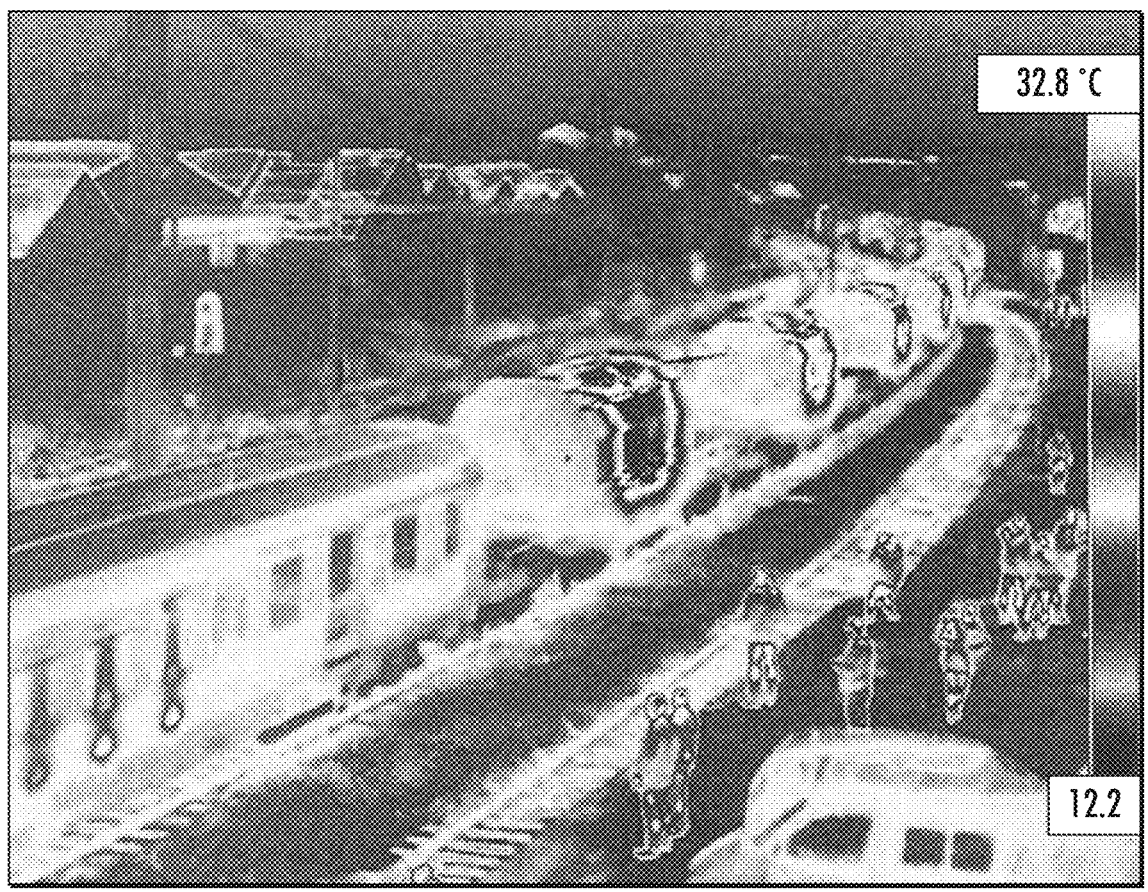
FIG. 13 is a thermal image of a train and multiple individuals.
Figure 14:
FIG. 14 is a thermal image of a human running away.
Figure 15:
FIGS. 15-16 are thermal images from testing taken with a forward looking infrared (FLIR) camera at 640×480 resolution.
Figure 16:
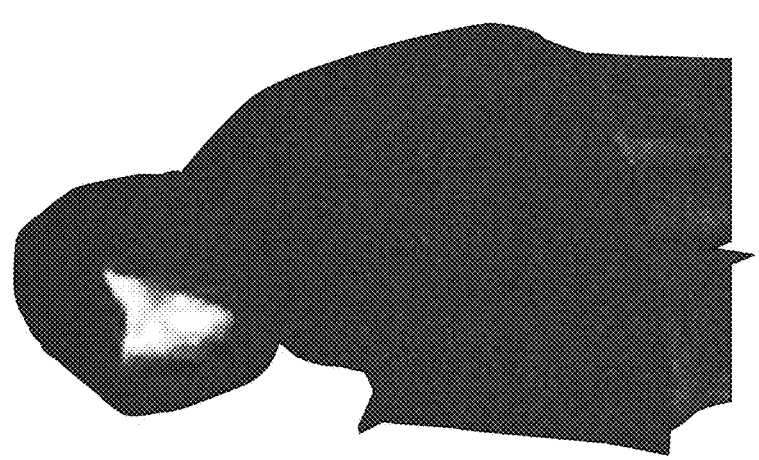
Figure 16:
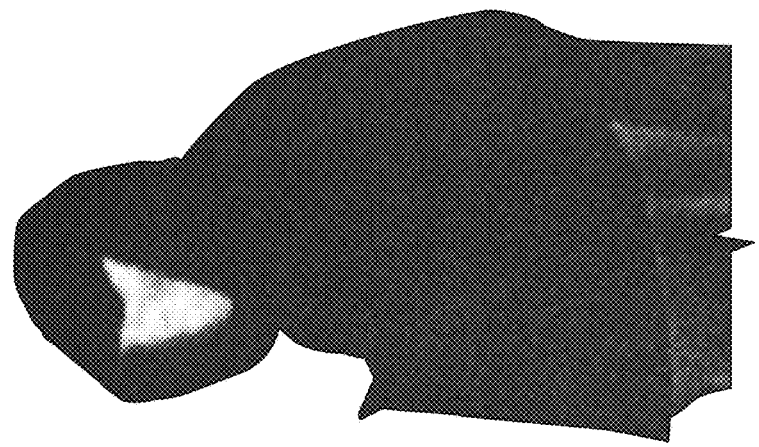
Figure 16:
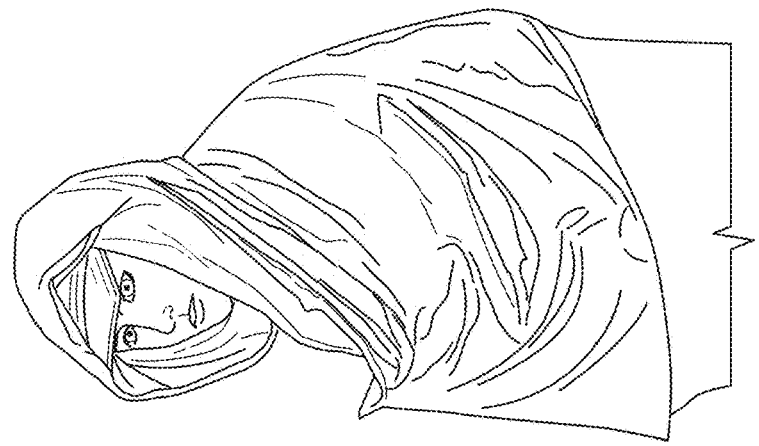
Figure 17:
FIGS. 17-19 are drawings showing camouflage outerwear embodiments of the thermal masking material of the invention.
Figure 18:
Figure 19:
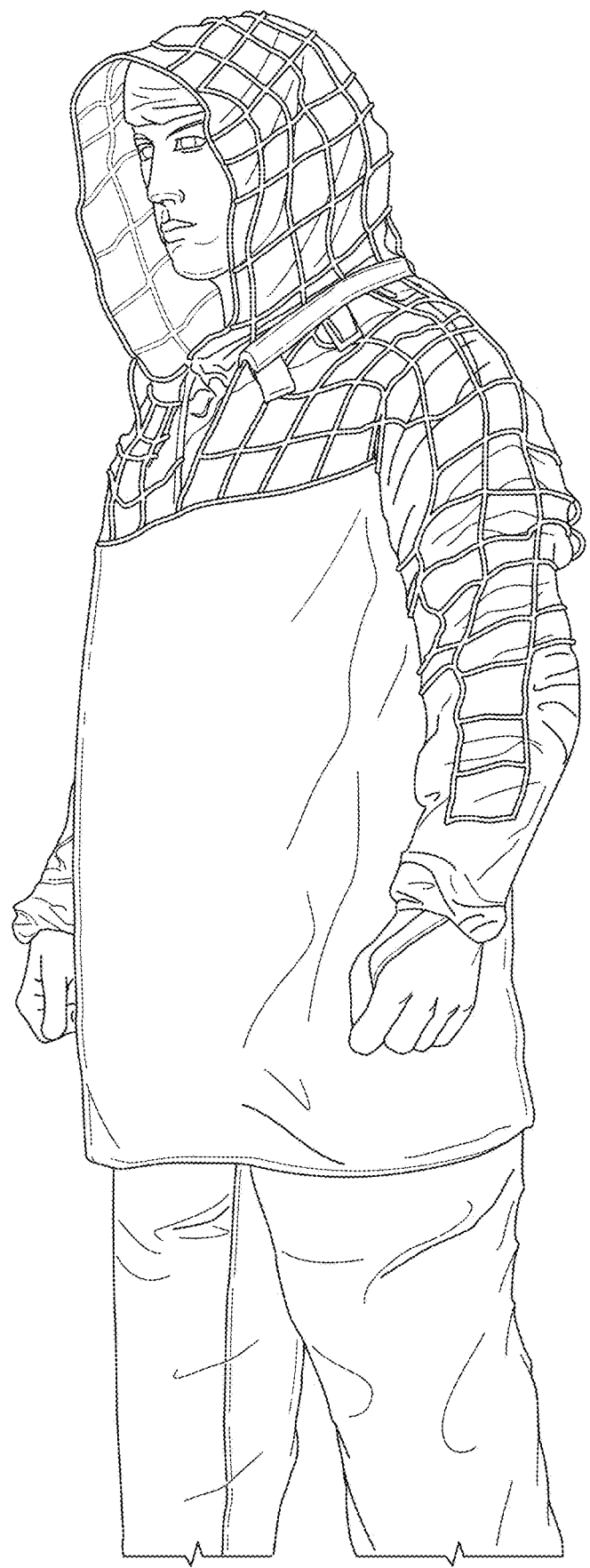
Figure 20:
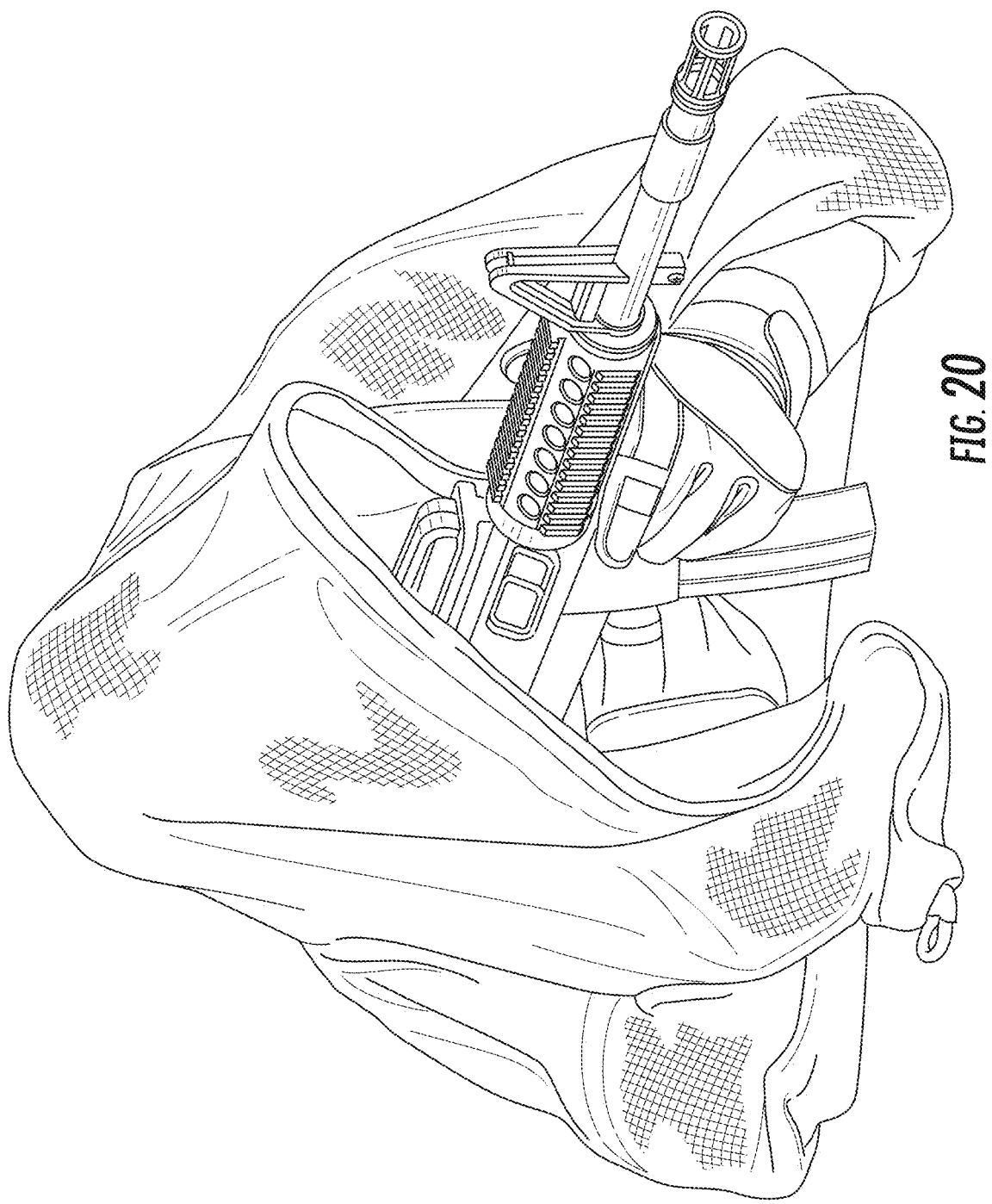
FIG. 20 is a photograph showing a sniper-blind embodiment of the thermal masking material of the invention.
Figure 21:
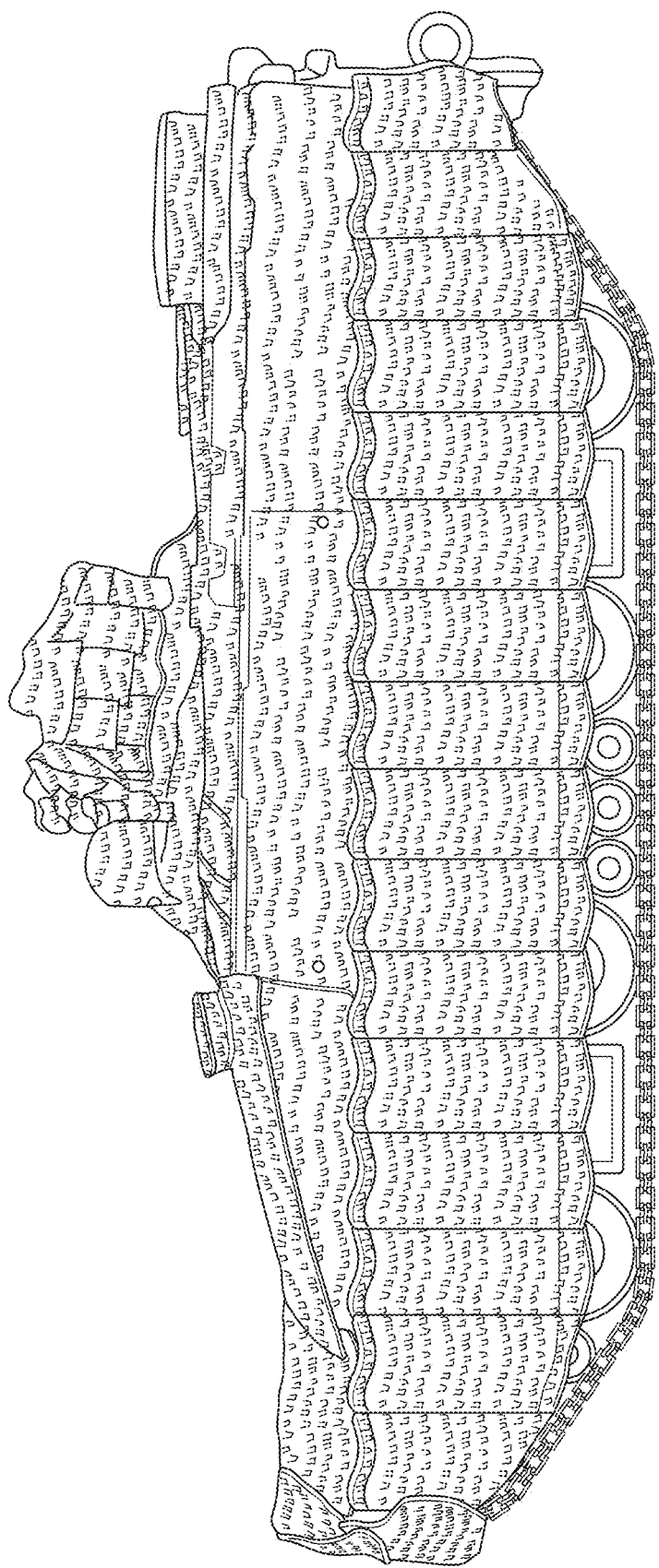
FIG. 21 is a drawing showing a tank-covering embodiment of the thermal masking material of the invention.
Figure 22:
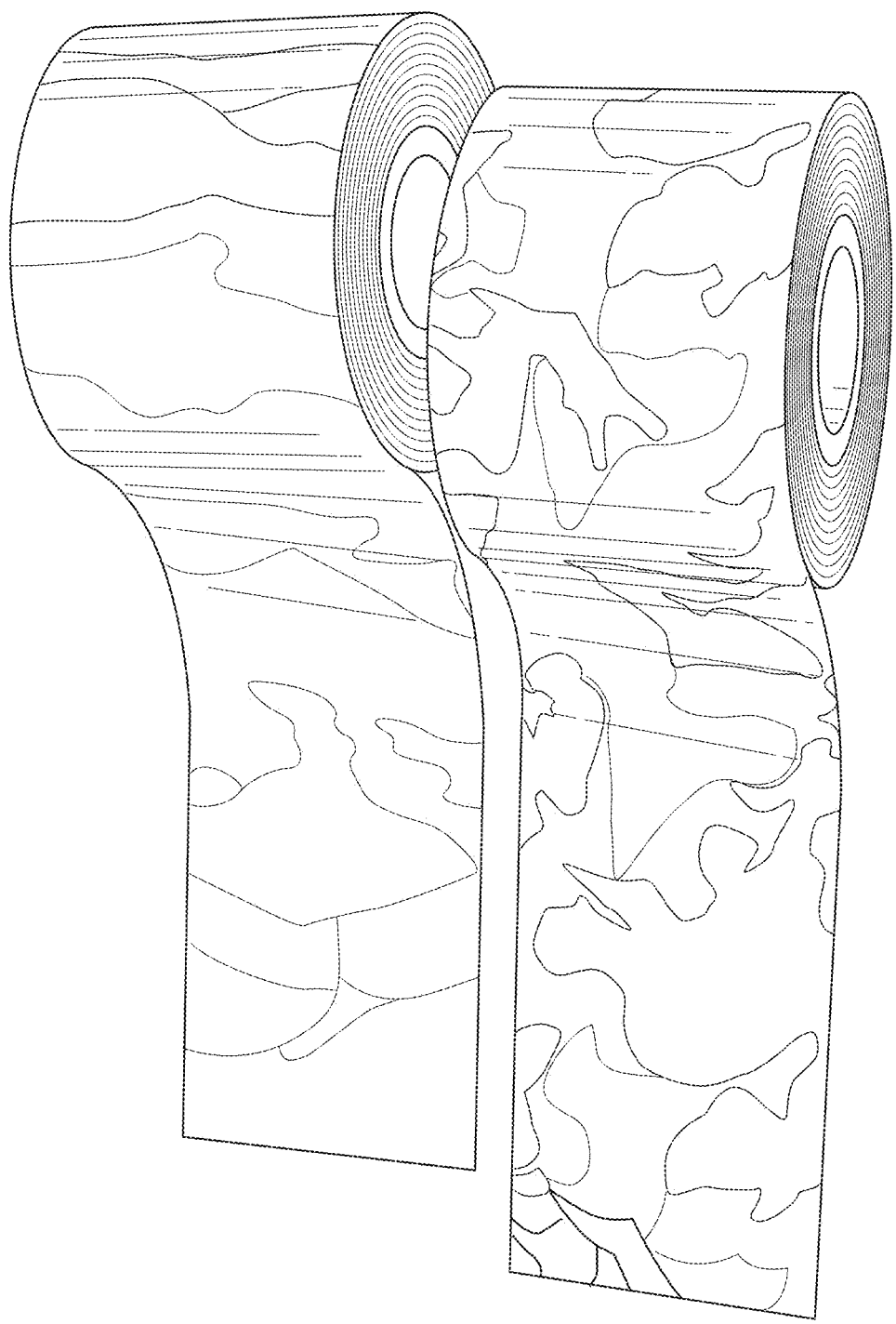
FIG. 22 is a drawing showing a camouflage thermal masking tape embodiment of the thermal masking material of the invention.

The thermal masking material may have a variety of uses. FIGS. 12-14 show various thermal images which illustrate infrared heat emanating from a human body (FIG. 12), a train and multiple individuals (FIG. 13), and a human running away (FIG. 14), and FIGS. 15-16 shows the results of thermal testing of embodiments of the invention using a FLIR camera. FIGS. 17-22 show that the thermal masking material may have a variety of uses such as, for example, camouflage outerwear for hunting or military applications (FIGS. 17-19), a sniper blind (FIG. 20), a tank covering (FIG. 21), and a thermal masking tape (FIG. 22). Any of the products shown in FIGS. 17-22 are contemplated as within the scope of the invention, including any variations which can be conceived by a skilled artisan.

In aspects, the invention includes a material comprising a colored or printed outer surface and a continuous metalized reflective surface there beneath.

In aspects, the invention includes a material comprising a colored or printed outer surface and a continuous metalized reflective surface there beneath, wherein the reflective surface is an inner liner.

In aspects, the invention includes a reflective surface disposed between an inner liner and the outer surface.

In aspects, the invention includes a material comprising a colored or printed outer surface and a continuous metalized reflective surface there beneath, wherein the outer surface comprises nylon and the continuous metalized reflective surface is attached or bonded to an underside of the nylon.

In aspects, the invention covers a material comprising a colored or printed outer surface and a continuous metalized reflective surface there beneath, wherein the outer surface comprises Ripstop or nylon with interwoven reinforcement threads arranged in a cross hatch pattern.

In aspects, the invention includes a material comprising a colored or printed outer surface and a continuous metalized reflective surface there beneath, wherein the reflective surface is disposed between the outer layer and an inner layer and the inner layer is water resistant.

In aspects, the invention includes a material comprising a colored or printed outer surface and a continuous metalized reflective surface there beneath, wherein the reflective surface is disposed between the outer layer, which is water resistant, and an inner layer, which is porous.

In aspects, the invention includes tape comprising a colored or printed outer surface or layer, a continuous metalized reflective middle layer, and an innermost surface or layer comprising an adhesive.

In aspects, the invention includes a method of using said tape for one or more of a sniper blind, clothing, camouflage clothing, camouflage covering, or camouflage sniper blind, or combinations thereof.

In aspects, the invention includes a method of using said tape to cover equipment, whereby an air gap is disposed between the equipment and the material. This method may further comprise circulating cooled air in the air gap.

In aspects, the invention includes a method of using said tape to cover a human, whereby an air gap is disposed between the human and the material. This method may further comprise circulating cooled air in the air gap.

In aspects, the invention includes a thermal masking product comprising a first, second, and third surface layered together, wherein the second surface is a reflective surface and is disposed between the first surface and the third surface such that the reflective surface of the second surface is completely or partially covered.

In aspects of the thermal masking product, the second surface is infrared (IR) reflective with an emissivity of 0.5 to 0.20.

In aspects of the thermal masking product, the second surface comprises metalized polyester film.

In aspects of the thermal masking product, the thermal masking product is a thermal masking tape wherein the first and/or third surfaces comprise an adhesive.

In aspects of the thermal masking product, the first surface comprises printed Rip Stop Nylon, nylon with interwoven reinforcement threads arranged in a cross hatch pattern, or a coated membrane fabric.

In aspects of the thermal masking product, the product is an article of clothing.

In aspects of the thermal masking product, the second surface is laminated to the first surface, and the first or third surfaces comprise nylon.

In aspects of the thermal masking product, the second surface comprises metalized polyester film.

In aspects of the thermal masking product, the metalized polyester film has a reflectivity in the range of 80% to 100%.

In aspects of the thermal masking product, the second layer of material further comprises interwoven reinforcement threads arranged in a cross hatch pattern.

In aspects of the thermal masking product, the first surface is an outer surface comprising a coating chosen from one or more of a water repellant coating, a non-breathable coating, a non-porous coating, a hydrophobic coating, a UV blocking coating, or a UV filtering coating, or combinations thereof.

In aspects, the invention includes a thermal masking product comprising three or more of the following layers:
  A. printed Rip Stop Nylon;
  B. an IR Reflective material with an emissivity within the range of 0.05 to 0.4;
  C. nylon;
  D. open or closed cell insulation foam; and/or
  E. microfleece or similar material
wherein layer "B" is always present in the thermal masking product and is disposed between any one or more of layers A, C, D, or E.

In aspects, the thermal masking product is reversible and comprises the layers in the following order: A, B, C, D, C, B, and A.

In other aspects, the thermal masking product is not reversible and comprises the layers in the following order: A, B, C, D, C, B, and A.

In other aspects, the thermal masking product is reversible and comprises the layers in the following order: A, B, C, D, E, D, C, B, and A.

In other aspects, the thermal masking product is not reversible and comprises the layers in the following order: A, B, C, D, E, D, C, B, and A.

In other aspects, the thermal masking product is reversible and comprises the layers in the following order: A, B, C, D, and E.

In other aspects, the thermal masking product is not reversible and comprises the layers in the following order: A, B, C, D, and E.

In other aspects, the thermal masking product is reversible and comprises the layers in the following order: A, B, C, and D.

In other aspects, the thermal masking product is not reversible and comprises the layers in the following order: A, B, C, and D.

In other aspects, the thermal masking product is reversible and comprises the layers in the following order: A, B, and C.

In other aspects, the thermal masking product is not reversible and comprises the layers in the following order: A, B, and C.

In other aspects, the thermal masking product is reversible and comprises the layers in the following order: C, B, and A.

In other aspects, the thermal masking product is not reversible and comprises the layers in the following order: C, B, and A.

In other aspects, the thermal masking product is an article of clothing.

In other aspects of the thermal masking product, layer B is laminated to layer A or layer C.

In aspects of the thermal masking product, layer B comprises polyester film.

In aspects of the thermal masking product, layer B comprises metalized polyester film.

In aspects of the thermal masking product, layer B is laminated to layer A or layer C and the thermal masking product comprises nylon with interwoven reinforcement threads arranged in a cross hatch pattern.

In aspects of the thermal masking product, the metalized polyester film has a reflectivity in the range of 80% to 100%.

In aspects of the thermal masking product, it is a plurality of plates configured to fit together to cover a piece of equipment.

Various dimensions, materials, designs and embodiments provided in this disclosure are not intended to be limiting but are rather provided by way of example only. An artisan of ordinary skill is capable of modifying the dimensions of the protective sleeve to accommodate mobile or portable electronic devices of different dimensions, including a flip phone, smart phone, tablet, and laptop computer, according to the manufacturing specifications of a particular electronic device. The interior dimensions can thus be modified to accommodate electronic devices of different sizes. Further, other embodiments of the invention may include materials which have equivalent capabilities to those discussed herein, which may be apparent to a person who is skilled in the art.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A protective sleeve comprising a cavity, wherein the cavity is capable of holding an electronic device or a thermally sensitive pharmaceutical, and wherein the protective sleeve further comprises:
  a first layer which is a reflective layer comprising a reflective metalized surface;
  a second layer comprising nylon, wherein the first layer is bonded to the second layer to provide the first layer with increased durability;
  a third layer comprising a foam material; and
  a fourth innermost layer comprising a textile material comprising an antimicrobial agent, wherein the fourth innermost layer has at least one side that forms the cavity within the protective sleeve;
  wherein the first layer, the second layer, the third, and the fourth innermost layer are in a stacked configuration.

2. The protective sleeve of claim 1, wherein the fourth innermost layer contacts the electronic device or the thermally sensitive pharmaceutical held within the cavity of the protective sleeve.

3. The protective sleeve of claim 1, wherein the first layer is polyester film, and wherein the first layer is laminated by heat and pressure to the second layer comprising nylon.

4. The protective sleeve of claim 1, further comprising a colored or printed outer surface material.

5. The protective sleeve of claim 1, wherein the textile material comprises microfleece or polyester.

6. The protective sleeve of claim 1, wherein the reflective metalized surface of the first layer is oriented facing toward the cavity.

7. The protective sleeve of claim 1, wherein the reflective metalized surface of the first layer is oriented facing away from the cavity and towards an outside environment.

8. The protective sleeve of claim 1, wherein the first layer comprises one or more coating wherein the coating is chosen from one or more of a water repellant coating, a non-breathable coating, a non-porous coating, a hydrophobic coating, a UV blocking coating, or a UV filtering coating, or combinations thereof.

9. The protective sleeve of claim 1, further comprising one or more of:
    a) a woven tag;
    b) pull tabs;
    c) a tether attachment point;
    d) a user ID;
    e) a radiofrequency identification (RFID) or Bluetooth low energy (BLW) beacon system capable of alerting when the sleeve is lost;
    f) a radiofrequency identification (RFID) or Bluetooth low energy (BLW) beacon system capable of determining and/or transmitting the location of the sleeve; and/or
    g) a closure.

10. The protective sleeve of claim 1, wherein the protective sleeve is capable of floating in water when the electronic device or the thermally sensitive pharmaceutical is held within the cavity.

11. A protective sleeve comprising a cavity, wherein the cavity is capable of holding an electronic device or a thermally sensitive pharmaceutical, and wherein the protective sleeve further comprises:
    a first outer layer of a printed or colored material;
    a second layer comprising a reflective metalized surface;
    a third layer comprising nylon;
    a fourth layer comprising a foam material; and
    a fifth innermost layer comprising a textile material, wherein the textile material comprises an antimicrobial agent, and wherein the fifth innermost layer has one side that forms a center cavity of the protective sleeve;
    wherein the first layer, the second layer, the third layer, the fourth layer, and the fifth layer are in a stacked configuration.

12. The protective sleeve of claim 11, wherein the reflective metalized surface of the second layer is completely covered.

13. The protective sleeve of claim 11, wherein the reflective surface of the second layer of material is partially covered.

14. The protective sleeve of claim 11, wherein the second layer is bonded to the third layer.

15. The protective sleeve of claim 11, wherein the second layer of material comprises metalized film laminated to nylon.

16. The protective sleeve of claim 11, wherein the first layer of material provides an outer surface comprising printed Rip Stop Nylon or a coated membrane fabric.

17. The protective sleeve of claim 11, wherein the fifth innermost layer comprises microfleece or polyester.

18. The protective sleeve of claim 11, wherein the reflective metalized surface of the second layer is oriented facing toward the center cavity.

19. The protective sleeve of claim 11, wherein the reflective metalized surface of the second layer is oriented facing away from the center cavity and towards the first outer layer.

20. The protective sleeve of claim 11, wherein the first outer layer comprises one or more coating wherein the coating is chosen from one or more of a water repellant coating, a non-breathable coating, a non-porous coating, a hydrophobic coating, a UV blocking coating, or a UV filtering coating, or combinations thereof.

21. The protective sleeve of claim 11, further comprising one or more of:
    a) a woven tag;
    b) pull tabs;
    c) a tether attachment point;
    d) a user ID;
    e) a radiofrequency identification (RFID) or Bluetooth low energy (BLW) beacon system capable of alerting when the sleeve is lost;
    f) a radiofrequency identification (RFID) or Bluetooth low energy (BLW) beacon system capable of determining and/or transmitting the location of the sleeve; and/or
    g) a closure.

22. The protective sleeve of claim 1, wherein the antimicrobial agent comprises one or more of silver, zeolite, ammonium chloride, triclosan, chitosan, zinc, or combinations thereof.

23. The protective sleeve of claim 11, wherein the antimicrobial agent comprises silver, zeolite, ammonium chloride, triclosan, chitosan, zinc, or combinations thereof.

24. The protective sleeve of claim 1, wherein the antimicrobial agent is located within and/or applied to the first layer and the fourth innermost layer.

25. The protective sleeve of claim 11, wherein the antimicrobial agent is located within and/or applied to the first outer layer and the fifth innermost layer.

* * * * *